US011259980B2

(12) United States Patent
Polygerinos et al.

(10) Patent No.: US 11,259,980 B2
(45) Date of Patent: Mar. 1, 2022

(54) SOFT INFLATABLE EXOSUIT FOR KNEE REHABILITATION

(71) Applicants: ARIZONA BOARD OF REGENTS ON BEHALF OF ARIZONA STATE UNIVERSITY, Scottsdale, AZ (US); Dignity Health, San Francisco, CA (US)

(72) Inventors: Panagiotis Polygerinos, Gilbert, AZ (US); Saivimal Sridar, Mesa, AZ (US); Trent Maruyama, Phoenix, AZ (US); Christopher St. Clair, Phoenix, AZ (US); Christina Kwasnica, Phoenix, AZ (US)

(73) Assignees: ARIZONA BOARD OF REGENTS ON BEHALF OF ARIZONA STATE UNIVERSITY, Scottsdale, AZ (US); DIGNITY HEALTH, San Francisco, CA (US)

( * ) Notice: Subject to any disclaimer, the term of this patent is extended or adjusted under 35 U.S.C. 154(b) by 548 days.

(21) Appl. No.: 16/050,938

(22) Filed: Jul. 31, 2018

(65) Prior Publication Data
US 2019/0029914 A1 Jan. 31, 2019

Related U.S. Application Data

(60) Provisional application No. 62/539,016, filed on Jul. 31, 2017.

(51) Int. Cl.
*A61H 3/00* (2006.01)
*A63B 21/00* (2006.01)
(Continued)

(52) U.S. Cl.
CPC ............. *A61H 3/00* (2013.01); *A61H 1/0237* (2013.01); *A61H 1/0262* (2013.01);
(Continued)

(58) Field of Classification Search
CPC . A61H 3/00; A61H 3/04; A61H 3/008; A61H 1/0266; A61H 1/0244; A61H 1/024;
(Continued)

(56) References Cited

U.S. PATENT DOCUMENTS 5,078,128 A * 1/1992 Grim ............... A61F 5/0127
602/23
5,464,385 A * 11/1995 Grim ............... A61F 5/0127
602/23
(Continued)

FOREIGN PATENT DOCUMENTS

WO 2019/183397 A1 9/2019

OTHER PUBLICATIONS

Papaxanthis, C., Pozzo, T., Popov, K. E., & Mcintyre, J. (1998). Hand trajectories of vertical arm movements in one-G and zero-G environments. Experimental Brain Research, 120(4), 496-502. doi:10.1007/s002210050423.
(Continued)

*Primary Examiner* — Garrett K Atkinson
(74) *Attorney, Agent, or Firm* — Michael Best & Friedrich LLP

(57) ABSTRACT

A soft-inflatable exosuit for knee rehabilitation is fabricated in two different beam-like structures (I and O cross-section actuators) and mechanically characterized for their torque performance in knee-extension assistance. The fabrication procedure of both types of actuators is presented as well as their integration into a light-weight, low-cost and body-conforming interface. To detect the activation duration of the device during the gait cycle, a soft-silicone insole with embedded force-sensitive resistors (FSRs) is used. In evaluation studies, the soft inflatable exosuit device is tested for its ability to reduce muscle activity during the swing phase of the knee. Using sEMG (surface electromyography) sen-
(Continued)

sors, the rectus femoris muscle group of a healthy individual is recorded while walking on a treadmill at a constant speed, with and without the soft device.

18 Claims, 31 Drawing Sheets

(51) Int. Cl.
  *A61H 1/02* (2006.01)
  *A61H 31/00* (2006.01)
  *A63B 1/00* (2006.01)
  *B25J 9/00* (2006.01)
  *F03G 7/08* (2006.01)

(52) U.S. Cl.
  CPC ......... *A61H 31/004* (2013.01); *A61H 31/005* (2013.01); *A61H 31/006* (2013.01); *A61H 31/007* (2013.01); *A61H 31/008* (2013.01); *A63B 1/00* (2013.01); *A63B 21/00181* (2013.01); *A61H 1/024* (2013.01); *A61H 2003/001* (2013.01); *A61H 2003/005* (2013.01); *A61H 2003/007* (2013.01); *A61H 2201/0103* (2013.01); *A61H 2201/0146* (2013.01); *A61H 2201/0176* (2013.01); *A61H 2201/0184* (2013.01); *A61H 2201/0192* (2013.01); *A61H 2201/1215* (2013.01); *A61H 2201/1238* (2013.01); *A61H 2201/1253* (2013.01); *A61H 2201/1261* (2013.01); *A61H 2201/165* (2013.01); *A61H 2201/169* (2013.01); *A61H 2201/1619* (2013.01); *A61H 2201/1635* (2013.01); *A61H 2201/1652* (2013.01); *A61H 2201/1657* (2013.01); *A61H 2201/50* (2013.01); *A61H 2201/5023* (2013.01); *A61H 2201/5046* (2013.01); *A61H 2201/5056* (2013.01); *A61H 2201/5061* (2013.01); *A61H 2201/5064* (2013.01); *A61H 2201/5069* (2013.01); *A61H 2201/5071* (2013.01); *A61H 2201/5092* (2013.01); *A61H 2203/0456* (2013.01); *A61H 2205/102* (2013.01); *A61H 2230/065* (2013.01); *A61H 2230/25* (2013.01); *A61H 2230/42* (2013.01); *A61H 2230/60* (2013.01); *A61H 2230/605* (2013.01); *B25J 9/0006* (2013.01); *F03G 7/08* (2013.01)

(58) Field of Classification Search
  CPC .... A61H 2201/1238; A61H 2201/5061; A61H 2201/5097; A61H 2201/5007; A61H 2003/043; A61H 2201/5064; A61H 2201/0107; A61H 2201/123; A61H 2201/5069; A61H 2201/5084; A61H 1/0277; A61H 2201/5071; A61H 1/0237; A61H 31/008; A61H 31/005; A61H 31/007; A61H 31/004; A61H 1/0262; A61H 31/006; A61H 2201/0146; A61H 2201/1657; A61H 2201/5056; A61H 2201/0176; A61H 2203/0456; A61H 2201/0192; A61H 2003/001; A61H 2201/1619; A61H 2230/25; A61H 2205/102; A61H 2201/5092; A61H 2201/1652; A61H 2201/5023; A61H 2201/1253; A61H 2201/50; A61H 2201/5046; A61H 2201/5046; A61H 2230/065; A61H 2201/0103; A61H 2201/1215; A61H 2230/60; A61H 2201/0184; A61H 2201/169; A61H 2201/1635; A61H 2201/165; A61H 2003/005; A61H 2003/007; A61H 2230/605; A61H 2201/1261; A61H 2201/1409; A61H 2201/0173; A61H 2201/1685; A61H 9/0085; A63B 21/00181; A63B 21/4009; A63B 69/0064; A63B 21/4025; A63B 24/0087; A63B 21/0058; A63B 71/0054; A63B 21/152; A63B 21/00178; A63B 26/003; A63B 21/157; A63B 2024/0093; A63B 2220/803; A63B 2220/51; A63B 2071/0072; A63B 2220/16; A63B 2225/50; A63B 2071/025; A63B 2220/89; A63B 2225/20; A63B 2071/0655; A63B 2220/40; A63B 2022/0092; A63B 1/00; A63B 23/0494; A63B 2209/00; A63B 2230/60; A63B 2220/56; A63B 2220/52; A63B 2220/833; A63B 2210/50; A63B 2071/0081; A63B 2209/10; A63B 2225/62; A63B 2225/02; A63B 2220/806; A63B 2220/80; G09B 19/003; B25J 9/0006; F03G 7/08
  See application file for complete search history.

(56) References Cited

U.S. PATENT DOCUMENTS

| | | | | |
|---|---|---|---|---|
| 7,998,092 | B2 * | 8/2011 | Avni | A61N 1/36003 600/587 |
| 8,079,967 | B2 * | 12/2011 | Ikeuchi | A61H 3/008 601/5 |
| 8,202,234 | B2 * | 6/2012 | Ikeuchi | A61H 3/00 601/5 |
| 8,303,521 | B2 * | 11/2012 | Ikeuchi | B25J 9/0006 600/595 |
| 8,784,350 | B2 * | 7/2014 | Cohen | A61F 5/012 602/27 |
| 8,915,132 | B1 * | 12/2014 | Ward | A61B 5/103 73/172 |
| 9,351,900 | B2 * | 5/2016 | Walsh | A61F 2/68 |
| 9,582,072 | B2 * | 2/2017 | Connor | G06F 3/011 |
| 10,427,293 | B2 * | 10/2019 | Asbeck | B25J 9/0006 |
| D870,297 | S * | 12/2019 | Chase | D24/190 |
| 10,492,974 | B2 * | 12/2019 | Chase | A61H 9/0078 |
| D873,497 | S * | 1/2020 | Chase | D29/108 |
| 10,543,110 | B2 * | 1/2020 | Piercy | A61F 2/70 |
| 10,561,881 | B2 * | 2/2020 | Matsuura | A63B 23/0482 |
| 10,611,020 | B2 * | 4/2020 | Griffith | B25J 9/142 |
| 10,736,810 | B2 * | 8/2020 | Caires | A61H 1/0244 |
| 10,780,012 | B2 * | 9/2020 | Lamb | A61H 3/00 |
| 10,966,895 | B2 * | 4/2021 | Lamb | A61H 3/00 |
| 2009/0048686 | A1 * | 2/2009 | Ikeuchi | B25J 9/0006 623/27 |
| 2010/0010639 | A1 * | 1/2010 | Ikeuchi | B25J 9/0006 623/24 |
| 2010/0256538 | A1 * | 10/2010 | Ikeuchi | B25J 9/0006 601/35 |
| 2012/0150086 | A1 * | 6/2012 | Cohen | A61F 5/012 602/27 |
| 2013/0236867 | A1 * | 9/2013 | Avni | G09B 19/003 434/247 |
| 2015/0073322 | A1 * | 3/2015 | Cohen | A61F 5/0104 602/13 |
| 2015/0088043 | A1 * | 3/2015 | Goldfield | A61F 5/01 602/6 |
| 2015/0173993 | A1 * | 6/2015 | Walsh | A61F 2/68 414/4 |
| 2015/0029079 | A1 | 10/2015 | Griffith et al. | |
| 2015/0309563 | A1 * | 10/2015 | Connor | G06F 3/017 73/865.4 |
| 2015/0321339 | A1 * | 11/2015 | Asbeck | B25J 9/0006 414/7 |

(56) References Cited

U.S. PATENT DOCUMENTS

| | | | |
|---|---|---|---|
| 2016/0022043 | A1 | 8/2016 | Walsh et al. |
| 2016/0220438 | A1* | 8/2016 | Walsh .................... B25J 9/0006 |
| 2016/0027894 | A1 | 9/2016 | Piercy et al. |
| 2016/0278948 | A1* | 9/2016 | Piercy ........................ A61F 2/60 |
| 2016/0033156 | A1 | 11/2016 | Tong et al. |
| 2018/0028952 | A1 | 10/2018 | Zhu et al. |
| 2019/0016750 | A1 | 6/2019 | Polygerinos et al. |
| 2019/0024721 | A1 | 8/2019 | Govin et al. |
| 2019/0031498 | A1 | 10/2019 | Polygerinos et al. |
| 2019/0033631 | A1 | 11/2019 | Polygerinos et al. |
| 2020/0138604 | A1* | 5/2020 | Piercy ...................... A43B 7/20 |

OTHER PUBLICATIONS

Aguirre-Ollinger, G., Colgate, JE., Peshkin, MA., Goswami, A., Aubin, PM., Sallum, H et al (2007). "Active-impedance control of a lower-limb assistive exoskeleton" 2007 IEEE 10th International Conference on Rehabilitation Robotics, ICORR'07 188-195.

Aubin, PM., Sallum, H., Walsh, C., Stirling, L., and Correia, A. (2013). "A pediatric robotic thumb exoskeleton for at-home rehabilitation: The Isolated Orthosis for Thumb Actuation (IOTA)" IEEE International Conference on Rehabilitation Robotics (Seattle, WA, USA).

Awad, L. N., Bae, J., O'Donnell, K., De Rossi, S. M. M., Hendron, K., Sloot, L. H., et al. (2017). A soft robotic exosuit improves walking in patients after stroke. Sci. Transl. Med. 9 (400):eaai9084. doi: 10.1126/scitranslmed. aai9084.

Banala, S. K., Agrawal, S. K., Fattah, A., Krishnamoorthy, V., Hsu, W.-L., Scholz, J., et al. (2006). "Gravity-balancing leg orthosis and its performance evaluation" IEEE Trans Robot 22 (6), 1228-1239. doi: 10.1109/TRO.2006.882928.

Bulea, T. C., Stanley, C. J., and Damiano, D. L. (2017). "Part 2: Adaptation of gait kinematics in unilateral cerebral palsy demonstrates preserved independent neural control of each limb" Front Hum Neurosci 11:50. doi: 10.3389/fnhum.2017.00050.

Byl, N. N. (2012). Mobility training using a bionic knee orthosis in patients in a poststroke chronic state: a case series. J. Med. Case Rep. 6:216. doi: 10.1186/1752-1947-6-216.

Chinimilli, P. T., Wachtel, S. W., Polygerinos, P., and Zhang, W. (2016). "Hysteresis Compensation for Ground Contact Force Measurement With Shoe-Embedded Air Pressure Sensors" United States: ASME.

Del-Ama, A. J., Koutsou, A. D., Moreno, J. C., de-los-Reyes, A., Gil-Agudo, A., and Pons, J. L. (2012). "Review of hybrid exoskeletons to restore gait following spinal cord injury" J. Rehabil. Res. Dev. 49 (4), 497. doi: 10.1682/JRRD.2011.03.0043.

El zahraa Wehbi, F., Huo, W., Amirat, Y., Rafei, ME., Khalil, M., and Mohammed, S. (2017). "Active impedance control of a knee-joint orthosis during swing phase" 2017 International Conference on Rehabilitation Robotics 435-40.

Faulkner, J. A., Gleadon, D., McLaren, J., and Jakeman, J. R. (2013). Effect of lowerlimb compression clothing on 400-m sprint performance. J. Strength Cond. Res. 27 (3), 669-676. doi: 10.1519/JSC.0b013e31825c2f50.

Godwin, K. M., Wasserman, J., and Ostwald, S. K. (2011). Cost associated with stroke: outpatient rehabilitative services and medication. Top. Stroke Rehabil. 18 (Suppl 1), 676-84. doi: 10.1310/tsr18s01-676.

Hamrin, E., Eklund, G., Hillgren, A. K., Borges, O., Hall, J., and Hellström, O. (1982). Muscle strength and balance in post-stroke patients. Ups. J. Med. Sci. 87 (1), 11-26. doi: 10.3109/03009738209178405.

Hanlon, M., and Anderson, R. (2009). Real-time gait event detection using wearable sensors. Gait Posture 30 (4), 523-527. doi: 10.1016/j.gaitpost.2009.07.128.

Huo, W., Mohammed, S., and Amirat, Y. (2015). "Observer-based active impedance control of a knee-joint assistive orthosis" Rehabilitation Robotics, vol. 2015—September 313-8.

Karavas, N., Ajoudani, A., Tsagarakis, N., Saglia, J., Bicchi, A., and Caldwell, D. (2013). "Tele-Impedance based stiffness and motion augmentation for a knee exoskeleton device" Robotics and Automation 2194-2200.

Kearney, R. E., and Hunter, I. W. (1990). System identification of human joint dynamics. Crit. Rev. Biomed. Eng. 18 (1), 55-87.

Lai, S. M., Studenski, S., Duncan, P. W., and Perera, S. (2002). Persisting consequences of stroke measured by the stroke impact scale. Stroke 33 (7), 1840-1844. doi: 10.1161/01.STR.0000019289.15440.F2.

Madgwick, SOH., Harrison, AJL., and Vaidyanathan, R. (2011). "Estimation of IMU and MARG orientation using a gradient descent algorithm" 2011 IEEE International Conference on Rehabilitation Robotics 1-7.

Merletti, R., and Hermens, H. (2000). Introduction to the special issue on the SENIAM European concerted action. J. Electromyogr. Kinesiol. 10 (5), 283-286. doi: 10.1016/S1050-6411(00)00019-5.

Polygerinos, P., Correll, N., Morin, S. A., Mosadegh, B., Onal, C. D., Petersen, K., et al. (2017). Soft robotics: review of fluid-driven intrinsically soft devices; manufacturing, sensing, control, and applications in human-robot interaction. Adv. Eng. Mater. 19 (12), 1700016-1700022. doi: 10.1002/adem.201700016.

Roy, A., Krebs, H. I., Williams, D. J., Bever, C. T., Forrester, L. W., Macko, R. M., et al. (2009). Robot-aided neurorehabilitation: a novel robot for ankle rehabilitation. IEEE Trans. Robot. 25 (3), 569-582. doi: 10.1109/TRO.2009.2019783.

Snell, R. S. (2011). Clinical anatomy by regions. Pennsylvania, United States: Lippincott Williams & Wilkins.

Thompson, J. A., Chaudhari, A. M., Schmitt, L. C., Best, T. M., and Siston, R. A. (2013). Gluteus maximus and soleus compensate for simulated quadriceps atrophy and activation failure during walking. J. Biomech. 46 (13), 2165-2172. doi: 10.1016/j.jbiomech.2013.06.033.

Venckūnas, T., Trinkūnas, E., Kamandulis, S., Poderys, J., Grūnovas, A., and Brazaitis, M. (2014). Effect of lower body compression garments in response to running session. ScientificWorldJournal 2014, 1-10. doi: 10.1155/2014/353040.

Wong, C. K., Bishop, L., and Stein, J. (2012). A wearable robotic knee orthosis for gait training: a case-series of hemiparetic stroke survivors. Prosthet. Orthot. Int. 36 (1), 113-120. doi: 10.1177/0309364611428235.

Zhang, W., Tomizuka, M., and Byl, N. (2016). A wireless human motion monitoring system for smart rehabilitation. J. Dyn. Syst. Meas. Control 138 (11):111004. doi: 10.1115/1.4033949.

Bamberg, S. et al., "Gait Analysis Using a Shoe-Integrated Wireless Sensor System", IEEE Transactions on Information Technology in Biomedicine, Jul. 2008, vol. 12, No. 4, pp. 413-423 <DOI:10.1109/TITB.2007.899493>.

Banala, S. et al., "Active Leg Exoskeleton (ALEX) for gait rehabilitation of motor-impaired patients", Conference on Rehabilitation Robotics (Noordwijk, Netherlands, Jun. 13-15, 2007), 2007 (Date added to IEEE Xplore: Jan. 2014, 2008), pp. 401-407 <DOI:10.1109/ICORR.2007.4428456>.

Beyl, P. et al., "An exoskeleton for gait rehabilitation: Prototype design and control principle", IEEE International Conference on Robotics and Automation (Pasadena, CA, May 19-23, 2008), 2008 (Date added to IEEE Xplore: Jun. 13, 2008), pp. 2037-2042 <DOI:10.1109/ROBOT.2008.4543506>.

Caldwell, D. et al., "'Soft' Exoskeletons for Upper and Lower Body Rehabilitation—Design, Control and Testing", International Journal of Human Robotics, Sep. 2007, vol. 4, No. 3, pp. 549-573 DOI:10.1142/S0219843607001151>.

Cavanagh, P. et al., "Knee joint torque during the swing phase of normal treadmill walking", Journal of Biomechanics, Sep. 1975, vol. 8, No. 5, pp. 337-344 <DOI:10.1016/0021-9290(75)90086-X>.

Chantraine, F. et al., "Effect of the rectus femoris motor branch block on post-stroke stiff-legged gait", Acta Neurologica Belgica, Sep. 2005, vol. 105, No. 3, pp. 171-177.

Ding, Y. et al., "Biomechanical and Physiological Evaluation of Multi-joint Assistance with Soft Exosuits", IEEE Transactions on Neural Systems and Rehabilitaton Engineering, Jan. 2016, vol. 25, No. 2, pp. 119-130 <DOI:10.1109/TNSRE.2016.2523250>.

(56) References Cited

OTHER PUBLICATIONS

Gere, M. et al., "Parallel-Axis Theorem for Moments of Interia", in Gere, M. et al., "Mechanics of Materials" (Cengage Learning, 2008), pp. 912-916.
In, H. et al., "Evaluation of the antagonistic tendon driven system for SNU Exo-Glove", 9th International Conference on Ubiquitous Robots and Ambient Intelligence (Daejeon, South Korea, Nov. 26-28, 2012), 2012 (Date added to IEEE Xplore: Feb. 19, 2013), pp. 507-509 <DOI:10.1109/URAI.2012.6463054>.
Lam, Q., "Microgravity Recondition Using Soft Robotics", Poster, FURI Research Program Symposium, Apr. 21, 2017.
Park, Y-L, et al., "Design and control of a bio-inspired soft wearable robotic device for ankle-foot rehabilitation", Bioinspiration and Biomimetics, Jan. 2014, vol. 9, No. 1, 17 pages <DOI:10.1088/1748-3182/9/1/016007>.
Quinlivan, B. et al., "Assistance magnitude vs. metabolic cost reductions for a tethered multiarticular soft exosuit", Science Robotics, Jan. 2017, vol. 2, No. 2, article 4416, 10 pages <DOI:10.1126/scirobotics.aah4416>.
Sanan, S. et al., "Pneumatic Torsional Actuators for Inflatable Robots", Journal of Mechanisms and Robotics, Apr. 2014, vol. 6, No. 3, article 031330, 7 pages <DOI:10.1115/1.4026629>.
Sanan, S. et al., "Robots with inflatable links", IEEE/RSJ International Conference on Intelligent Robots and Systems (St. Louis, MO, Oct. 10-15, 2009), 2009 (Date added to IEEE Xplore: Dec. 15, 2009), pp. 4331-4336 <DOI:10.1109/IROS.2009.5354151>.
Sanan, S., "Soft Inflatable Robots for Safe Physical Human Interaction", Carnegie Mellon University, Doctorate Thesis, Aug. 2013 [retrieved May 15, 2019], 238 pages, retrieved from the internet: <URL:http://www.cs.cmu.edu/~cga/soft/pdf/sanan-thesis.pdf>.
Sawicki, G. et al., "A pneumatically powered knee-ankle-foot orthosis (KAFO) with myoelectric activation and inhibition", Journal of NeuroEngineering and Rehabilitation, Jun. 2009, vol. 6, No. 23, 16 pages <DOI:10.1186/1743-0003-6-23>.
Veneman, J. et al., "Design and evaluation of the LOPES exoskeleton robot for interactive gait rehabilitation", IEEE Transactions on Neural Systems and Rehabilitation Engineering, Sep. 2007, vol. 15, No. 3, pp. 379-386 <DOI:10.1109/TNSRE.2007.903919>.
Wehner, M. et al., "A Lightweight Soft Exosuit for Gait Assistance", IEEE International Conference on Robotics and Automation (Karlsruhe, Germany, May 6-10, 2013), 2013 (Date added to IEEE Xplore: Oct. 17, 2013), pp. 3362-3369 <DOI:10.1109/ICRA.2013.6631046>.
Wehner, M. et al., "Lower Extremity Exoskeleton Reduces Back Forces in Lifting", ASME Conference on Dynamic Systems and Control (Hollywood, CA, Oct. 12-14, 2009), 2009, vol. 2, pp. 49-56 <DOI:10.1115/DSCC2009-2644>.
Yap, H. et al., "A Soft Exoskeleton for Hand Assistive and Rehabilitation Application using Pneumatic Actuators with Variable Stiffness", IEEE International Conference on Robotics and Automation (Seattle, WA, May 26-30, 2015), 2015 (Date added to IEEE Xplore: Jul. 2, 2015), pp. 4967-4972 <DOI:10.1109/ICRA.2015.7139889>.
Youtube Video, https://www.youtube.com/watch?v=qhEQuGrZlaM, Dec. 5, 2017.
S. M. Reid, S. K. Lynn, R. P. Musselman, and P. A. Costigan, "Knee biomechanics of alternate stair ambulation patterns," Med. Sci. Sports Exerc., vol. 39, No. 11, pp. 2005-2011, 2007.
N. Rao, A. Aruin, and A. Org, "The Effect of Ankle-Foot Orthoses on Balance Impairment: Single-Case Study of physical medicine & rehabilitation OPD at the Marianjoy Rehabilitation Hospital and Clinics in Wheaton, Illinois," Hhs Public Access, vol. 11, No. 1, pp. 15-19, 1999.
A. Srivastava and R. P. Tewari, "An Electromyography analysis of lower limb muscles for different locomotion activities," vol. 1, o. 3, pp. 3-5, 2012.
J. Lewis, G. Freisinger, X. Pan, R. Siston, L. Schmitt, and A. Chaudhari, "Changes in lower extremity peak angles, moments and muscle activations during stair climbing at different speeds," J. Electromyogr. Kinesiol., vol. 25, No. 6, pp. 982-989, 2015.

M. Q. Liu, F. C. Anderson, M. H. Schwartz, and S. L. Delp, "Muscle contributions to support and progression over a range of walking speeds," J. Biomech., vol. 41, No. 15, pp. 3243-3252, 2008.
A. Protopapadaki, W. I. Drechsler, M. C. Cramp, F. J. Coutts, and O. M. Scott, "Hip, knee, ankle kinematics and kinetics during stair ascent and descent in healthy young individuals," Clin. Biomech., vol. 22, No. 2, pp. 203-210, 2007.
M. E. Zabala, J. Favre, S. F. Scanlan, J. Donahue, T. P. Andriacchi, "Three-dimensional knee movments of ACL, reconstructed and control subjects during gait, stair ascent, and stair descent" Journal of Biomechanics, vol. 46, pp. 515-520.
Sridar, S., Nguyen, PH., Zhu, M., Lam, QP., and Polygerinos, P. (2017). "Development of a soft-inflatable exosuit for knee rehabilitation" 2017 IEEE/RSJ International Conference on Intelligent Robots and Systems (IROS) 3722-3727.
Y. C. Lin, L. A. Fok, A. G. Schache, and M. G. Pandy, "Muscle coordination of support, progression and balance during stair ambulation," J. Biomech., vol. 48, No. 2, pp. 340-347, 2015.
M. Hall, C. A. Stevermer, and J. C. Gillette, "Muscle activity amplitudes and co-contraction during stair ambulation following anterior cruciate ligament reconstruction," J. Electromyogr. Kinesiol., vol. 25, No. 2, pp. 298-304, 2015.
M. M. Momcilovic and N. Stergiou, "Joint moments and powers in healthy young adults during stair negotiation," vol. 1479180, p. 68, 2010.
S. Nadeau, B. J. McFadyen, and F. Malouin, "Frontal and sagittal plane analyses of the stair climbing task in healthy adults aged over 40 years: What are the challenges compared to level walking?," Clin. Biomech., vol. 18, No. 10, pp. 950-959, 2003.
P. A. Costigan, K. J. Deluzio, and U. P. Wyss, "Knee and hip kinetics during normal stair climbing," Gait Posture, vol. 16, No. 1, pp. 31-37, 2002.
D. Samuel, P. Rowe, V. Hood, and A. Nicol, "The biomechanical functional demand placed on knee and hip muscles of older adults during stair ascent and descent," Gait Posture, vol. 34, No. 2, pp. 239-244, 2011.
R. Riener, M. Rabuffetti, and C. Frigo, "Stair ascent and descent at different inclinations," Gait Posture, vol. 15, No. 1, pp. 32-44, 2002.
J.E. Zacazewski, MS, PT, SCS, ATC, P.O. Riley, PhD, D. E> Krebs, PhD, PT, "Biomechanical Analysis of Body Mass Transfer During Stair Ascent and Descent of Healthy Subjects," Journal of Rehabilitation Research and Development, vol. 30, No. 4, pp. 412-422, Nov. 4, 1993.
N. Harper, J. Wilken, and R. Neptune, "Muscle Function and Coordination of Stair Ascent," J. Biomechanical Engineering, vol. 140, No. January, pp. 1-11, 2018.
B. McFadyen and D. Winter, "An Integrated Biomechanical Analysis of Normal Stair Asecent and Descent," J. Biomech., vol. 21, No. 9, pp. 733-744, 1988.
R. C. Browning, J. R. Modica, R. Kram, and A. Goswami, "The effects of adding mass to the legs on the energetics and biomechanics of walking," Med. Sci. Sports Exerc., vol. 39, No. 3, pp. 515-525, 2007.
H. Kawamoto, S. L. S. Lee, S. Kanbe, and Y. Sankai, "Power assist method for HAL-3 using EMG-based feedback controller," SMC'03 Conf. Proceedings. 2003 IEEE Int. Conf. Syst. Man Cybern. Conf. Theme—Syst. Secur. Assur. (Cat. No.03CH37483), vol. 2, pp. 1648-1653, 2003.
Y. Saito, K. Kikuchi, H. Negoto, T. Oshima, and T. Haneyoshi, "Development of externally powered lower limb orthosis with bilateral-servo actuator," Proc. 2005 IEEE 9th Int. Conf. Rehabil. Robot., vol. 2005, pp. 394-399, 2005.
J. E. Pratt, B. T. Krupp, C. J. Morse, and S. H. Collins, "The RoboKnee: an exoskeleton for enhancing strength and endurance during walking," IEEE Int. Conf. Robot. Autom. 2004. Proceedings. ICRA '04. 2004, No. April, p. 2430-2435 vol. 3, 2004.
F. Sebastian, Q. Fu, M. Santello, and P. Polygerinos, "Soft Robotic Haptic Interface with Variable Stiffness for Rehabilitation of Neurologically Impaired Hand Function," Front. Robot. AI, vol. 4, No. December, pp. 2-10, 2017.
M. Zhu and I. A. Fulton, "DMD2017-3374 Carpal Tunnel Syndrome Soft Relief Device for Typing Applications," No. C, pp. 10-11, 2017.

(56) References Cited

OTHER PUBLICATIONS

A. Zoss and H. Kazerooni, "Design of an electrically actuated lower extremity exoskeleton," Adv. Robot., vol. 20, No. 9, pp. 967-988, 2006.

R. J. Farris, H. A. Quintero, and M. Goldfarb, "Performance evaluation of a lower limb exoskeleton for stair ascent and descent with Paraplegia," Proc. Annu. Int. Conf. IEEE Eng. Med. Biol. Soc. EMBS, pp. 1908-1911, 2012.

A. T. Asbeck, S. M. M. De Rossi, K. G. Holt, and C. J. Walsh, "A biologically inspired soft exosuit for walking assistance," Int. J. Rob. Res., vol. 34, No. 6, pp. 744-762, 2015.

A. C. Novak and B. Brouwer, "Sagittal and frontal lower limb joint moments during stair ascent and descent in young and older adults," Gait Posture, vol. 33, No. 1, pp. 54-60, 2011.

B. Husemann, F. Müller, C. Krewer, S. Heller, and E. Koenig, "Effects of locomotion training with assistance of a robot-driven gait orthosis in hemiparetic patients after stroke: A randomized controlled pilot study," Stroke, vol. 38, No. 2, pp. 349-354, 2007.

P. Plummer et al., "Effects of stroke severity and training duration on locomotor recovery after stroke: A pilot study," Neurorehabil. Neural Repair, vol. 21, No. 2, pp. 137-151, 2007.

M. L. Harris, M. I. Polkey, P. M. Bath, and J. Moxham, "Quadriceps muscle weakness following acute hemiplegic stroke," Clin. Rehabil., vol. 15, No. 3, pp. 274-281, 2001.

A. Danielsson, C. Willén, and K. S. Sunnerhagen, "Physical activity, ambulation, and motor impairment late after stroke," Stroke Res. Treat., vol. 2012, 2012.

A. C. Thomas, M. Villwock, E. M. Wojtys, and R. M. Palmieri-Smith, "Lower extremity muscle strength after anterior cruciate ligament injury and reconstruction," J. Athl. Train., vol. 48, No. 5, pp. 610-620, 2013.

S. Statistics, "The Internet Stroke Center," https://web.archive.org/web/20111015235116/www.strokecenter.org/patients/about-stroke/stroke-statistics.

E. A. Courtney-Long, MA, MSPH, D. D. Carroll, PhD, Q. C. Zhang, PhD, A. C. Stevens, MPH, S. Griffin-blake, PhD, B. S. Armour, PhD, V. A. Campbell, PhD, "Prevalence of Disability and Disability Type Among Adults—United States, 2013," Mmwr, vol. 64, No. 29, pp. 784-792, 2015.

S. Sridar, Z. Qiao, N. Muthukrishnan, W. Zhang, and P. Polygerinos, "A Soft-Inflatable Exosuit for Knee Rehabilitation: Assisting Swing Phase During Walking" published frontiers in Robotic AI, vol. 5, Article 44, Apr. 2018.

Polygerinos, P., Galloway, K. C., Sanan, S., Herman, M., & Walsh, C. J. (2015). EMG controlled soft robotic glove for assistance during activities of daily living. 2015 IEEE International Conference on Rehabilitation Robotics (ICORR). doi:10.1109/icorr.2015.7281175.

Yamakuchi, Munekazu, Itsuro Higuchi, Satoko Masuda, Yoshinobu Ohira, Toshikazu Kubo, Yutaka Kato, Ikuro Maruyama, and Isao Kitajima. "Type I muscle atrophy caused by microgravityinduced decrease of myocyte enhancer factor 2C (MEF2C) protein expression." FEBS Letters 477, No. 1-2 (2000): 135-40. doi:10.1016/s0014-5793(00) 31715-4.

Dunbar, B. (2004). Your Body in Space: Use It or Lose It. Retrieved Sep. 20, 2016, from http://www.nasa.gov/audience/forstudents/5-8/features/F_Your_Body_in_Space.html.

U.S. Appl. No. 15/829,597.

\* cited by examiner

SOFT INFLATABLE EXOSUIT FOR KNEE REHABILITATION

CROSS-REFERENCE TO RELATED APPLICATION

This application claims the benefit of U.S. Provisional Application No. 62/539,016 filed Jul. 31, 2017, the entire contents of which are incorporated herein by reference.

BACKGROUND

Stroke has become one of the leading causes of disability in the world that results in paralysis, loss of motor function, and muscle atrophy; usually requiring physical therapy and rehabilitation. Stroke can affect parts of the upper or lower limbs, or both, depending on the severity of the incident. With the rapid increase in the number of stroke patients, the demand for well-trained physical therapists and new methods for more effective physical rehabilitation has exponentially increased.

In particular, reports indicate that stroke patients with affected lower limbs can experience weakness and loss of control in their quadriceps muscles. In healthy individuals, quadriceps act as dampers which stabilize the knee joint and also produce extension motion of the leg during walking. However, in the case of individuals with paresis after a stroke, generation of the required knee-extension moment, so as to perform common mobility tasks, is partially lost. Therefore, to compensate for quadriceps weakness, patients resort to the adoption of new types of gait patterns for walking that deviate from the standard and can cause serious health and social repercussions. Potential solutions in aiding therapy of stroke afflicted patients is the use of robotic rehabilitation devices. Many attempts for physical rehabilitation of paretic limbs have been made in the form of rigid exoskeletons and assistive devices. The primary concern about these devices is that they are heavy, bulky, and not portable. The weight of these devices coupled with weakness in patients may lead to discomfort and increased dependency on supervised physical therapy.

Similarly, in the case of walking assistance during rehabilitation (e.g., after an injury to an Anterior Cruciate Ligament (ACL)), bulky devices may inhibit human motion causing an unnatural gait, which is detrimental for recovery. The issue of joint misalignment found in most rigid exoskeletons can cause further complications.

Stair climbing is an integral part of everyday mobility both at home and in the community. Considerable assistance or rehabilitation therapy is needed for people with lower limb disability, especially considering the risk of falls and the amount of muscular effort required to carry out this task. The peak knee flexion moments during stair ascent have been reported to be three times greater than those of level walking. For this reason, stair ambulation is more difficult to do for those with decrements in motor function, balance impairments, and/or reduced lower limb function.

Weakness caused by the above-mentioned pathologies (e.g., a stroke, a torn ACL, etc.) cause limb muscles to fail to fully activate and produce sufficient muscle torque for mobility. Therefore, there is a need for lightweight devices that offer a higher degree of compliance to the user and can successfully assist in rehabilitation scenarios. The use of soft orthotic devices aiding the rehabilitation of disabled limbs could minimize or eliminate these issues.

Astronauts also experience muscular weakness during extended stays in outer space. Microgravity atrophy is a condition that astronauts can develop that causes the decomposition of bones and muscles. Astronauts require about two hours of physical activity to combat the effects of microgravity atrophy. Exercise equipment is heavy and adds to the overall payload and operational costs. The use of a soft microgravity suit can supplement heavy equipment, and allow more time to be spent on research or other activities.

There are many advantages to soft robotics, such as flexibility, unobtrusiveness to a user, compliance, high power-to-weight ratio, and low fabrication costs. Typically, fluidic actuators, or cable driven mechanisms are used to provide joint torque support and minimize musculoskeletal system loading. Despite the recent advancements of inflatable actuators, enough literature is not published on the modeling and development of inflatable actuators for rehabilitative applications.

SUMMARY

Disclosed is a device aimed at assisting paretic or hemiparetic patients, helping them to swing their lower leg forward during walking and physical activities (e.g., to decrease the amount of muscular effort applied to a user's knee in stair mobility). As compared to other assistive devices, this disclosure describes a device using soft actuators which interface well with the human body. This device has been designed using fabrics and thermoplastic polyurethane urethane making it lightweight and form fitting. The device senses user intent using insole sensors and provides assistance otherwise remaining transparent during the knee joint motion.

The design, development and preliminary evaluation of a soft-inflatable exosuit for knee rehabilitation is disclosed. Soft-inflatable actuators made of heat-sealable thermoplastic polyurethane (TPU) materials may be fabricated in two different beam-like structures (i.e., "I" and "O" cross-section actuators) and mechanically characterized for their torque performance in knee-extension assistance. The fabrication procedure of both types of actuators is disclosed as well as their integration into a light-weight, low-cost and body-conforming interface.

To detect the activation duration of the device during the gait cycle, a soft-silicone insole with embedded force-sensitive resistors (FSRs) may be used. In evaluation studies, the soft inflatable exosuit device was tested for its ability to reduce muscle activity during the swing phase of the knee. Using sEMG (surface electromyography) sensors, the rectus femoris muscle group of a healthy individual was recorded while walking on a treadmill at a constant speed, with and without the soft device. Preliminary testing shows a promising 7% reduction in muscle activity and demonstrates the applicability of the soft-inflatable exosuit in knee rehabilitation scenarios.

In one embodiment, a soft-inflatable exosuit device includes an elastic fiber sleeve having a controller pouch and plurality of actuator pockets. A control device has at least one processor disposed within the controller pouch. The soft-inflatable exosuit device also has a plurality of adjustable straps and a plurality of removable inflatable actuators. Each actuator is configured to be inserted and removed from a corresponding actuator pocket.

In some embodiments, the device further includes an insole having a plurality of force-sensitive resistor sensors. In some embodiments, the device further includes at least one pneumatic supply source, at least one pneumatic valve, and at least one fluidic pressure sensor coupled to the plurality of inflatable actuators. In some embodiments, the device further includes a vacuum pump. In some embodiments, the control device controls operation of the at least one pneumatic supply source, the at least one pneumatic valve, and the at least one fluidic pressure sensor to inflate and deflate the actuators. In some embodiments, each of the actuators include one or more of an O cross-section and an I cross-section. In some embodiments, each actuator includes a plurality of thermoplastic polyurethane (TPU) layers, at least one heat seam, and at least one air passage. In some embodiments, the I cross-section includes a plurality of longitudinal members disposed parallel to each other, and a connecting member disposed between the plurality of longitudinal members and perpendicular to the longitudinal members.

In another embodiment, an exosuit device includes a sleeve having a pocket and an inflatable actuator removably inserted into the pocket. A sensor is positioned apart from the sleeve, and the sensor is in communication with the inflatable actuator. The sensor is configured to control the pressurization of the inflatable actuator. A control device has at least one processor.

In yet another embodiment, a method of operating a soft-inflatable exosuit device includes applying an elastic fiber sleeve having a controller pouch and plurality of actuator pockets to a knee of a patient; adjusting a plurality of adjustable straps to secure the sleeve to the knee; inserting a plurality of removable inflatable actuators into a plurality of actuator pockets; inflating the plurality of removable inflatable actuators between a mid-swing gait phase and a swing gait phase; and deflating the plurality of removable inflatable actuators between the swing gait phase and the mid-swing gait phase.

The feature or features of one embodiment may be applied to other embodiments, even though not described or illustrated, unless expressly prohibited by this disclosure or the nature of the embodiments.

DETAILED DESCRIPTION OF ILLUSTRATIVE EMBODIMENTS

Figure 1:
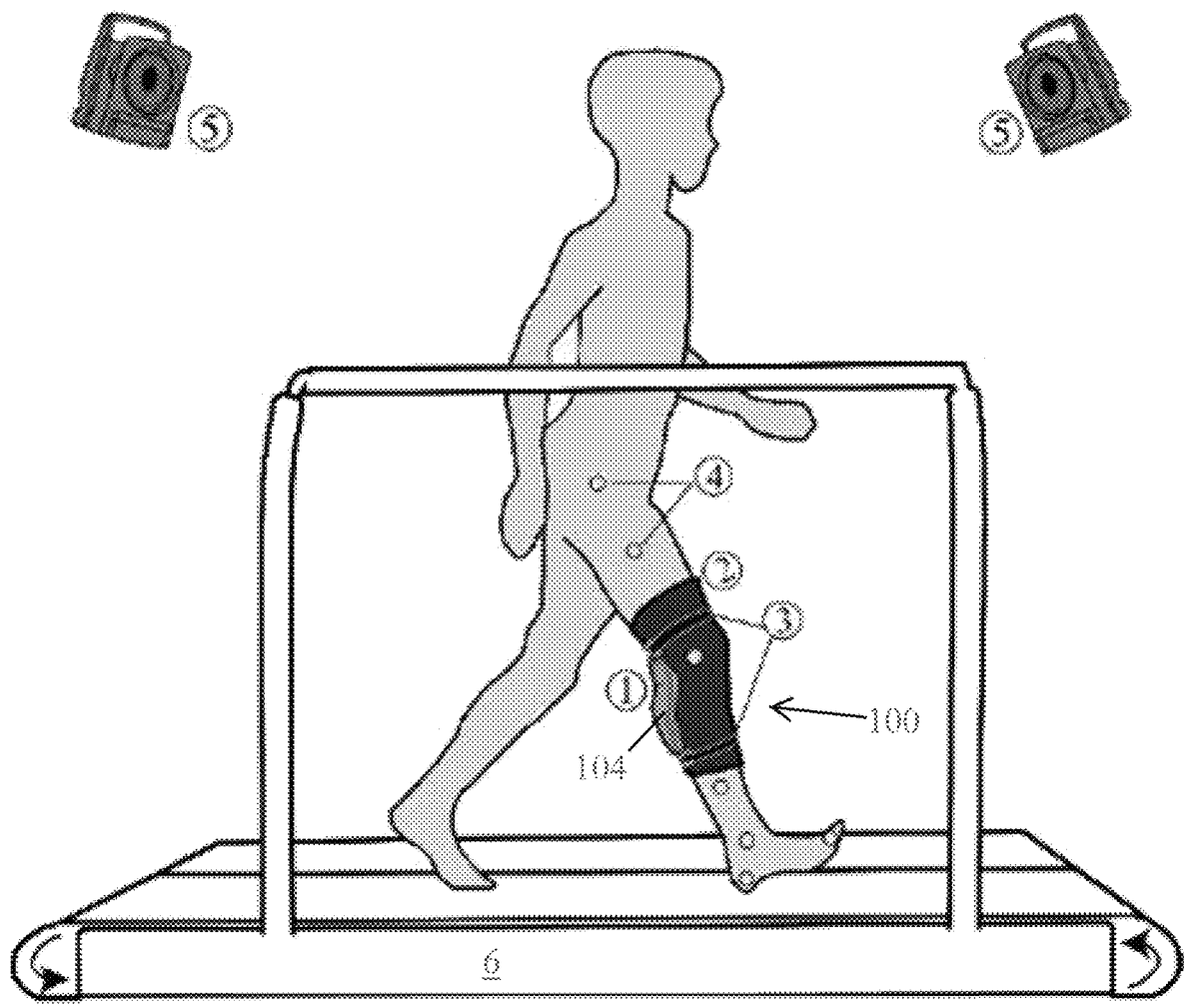
FIG. 1 shows a concept of an exemplary rehabilitative test setup done with a soft-inflatable knee exosuit according to an embodiment of the disclosure.

Disclosed are embodiments of a modular, lightweight, low-cost, soft knee exosuit that utilizes a new design of inflatable actuators to provide assistance to knee-extension motion during rehabilitation. FIG. 1 shows an illustration of the proposed concept where a user wears the soft-inflatable exosuit to perform rehabilitation exercises on a treadmill, while motion capture cameras and force sensors monitor knee-extension angles and ground reaction forces respectively. The disclosure discusses the biomechanical modeling of the knee joint during walking and covers a design and characterization of embodiments of inflatable actuators as well as integration of these inflatable actuators into an exosuit interface. Some preliminary evaluation and performance results of an exemplary embodiment of a soft exosuit prototype are also disclosed.

To set the functional requirements for the soft knee exosuit and the soft-inflatable actuators, the behavior of the knee joint and the muscles associated with the extension and flexion of the knee was investigated. Additionally, an experimental study of the knee angles and torque generated during walking was performed on an instrumented treadmill (e.g., side-by-side belt instrumented treadmill, Bertec Inc., Columbus, Ohio) with ground reaction force recording capabilities. A motion capture system (e.g., T40s, VICON Inc., Los Angeles, Calif.) with ten high-speed infrared cameras was also utilized to create a complete kinematic model of the lower body. Passive reflective markers were placed on the ankle, hip and knee joints along with a set of markers on the thigh, shin, foot and toe of a healthy test participant.

An illustration of the test platform and an exemplary embodiment of a knee exosuit (e.g., a soft-inflatable knee exosuit) 100 are shown in FIG. 1. In the embodiment shown in FIG. 1, the soft-inflatable knee exosuit 100 includes a knee-sleeve 2 (e.g., an elastic knee-sleeve) to attach the exosuit 100 to a user's leg. The elastic knee-sleeve 2 has one or more straps 3 (e.g., an upper strap 3 and a lower strap 3) to tighten and loosen the exosuit 100 from around the user's leg. The elastic knee-sleeve 2 also includes at least one pouch or pocket 1 that may store one or more inflatable actuators 104. Passive reflective markers 4 are positioned on the hip, thigh, knee, shin, ankle, heel, and toe of the user's leg. Motion capture camera(s) 5 are also provided to capture the movement of the user during gait tests on a treadmill 6.

Figure 2:
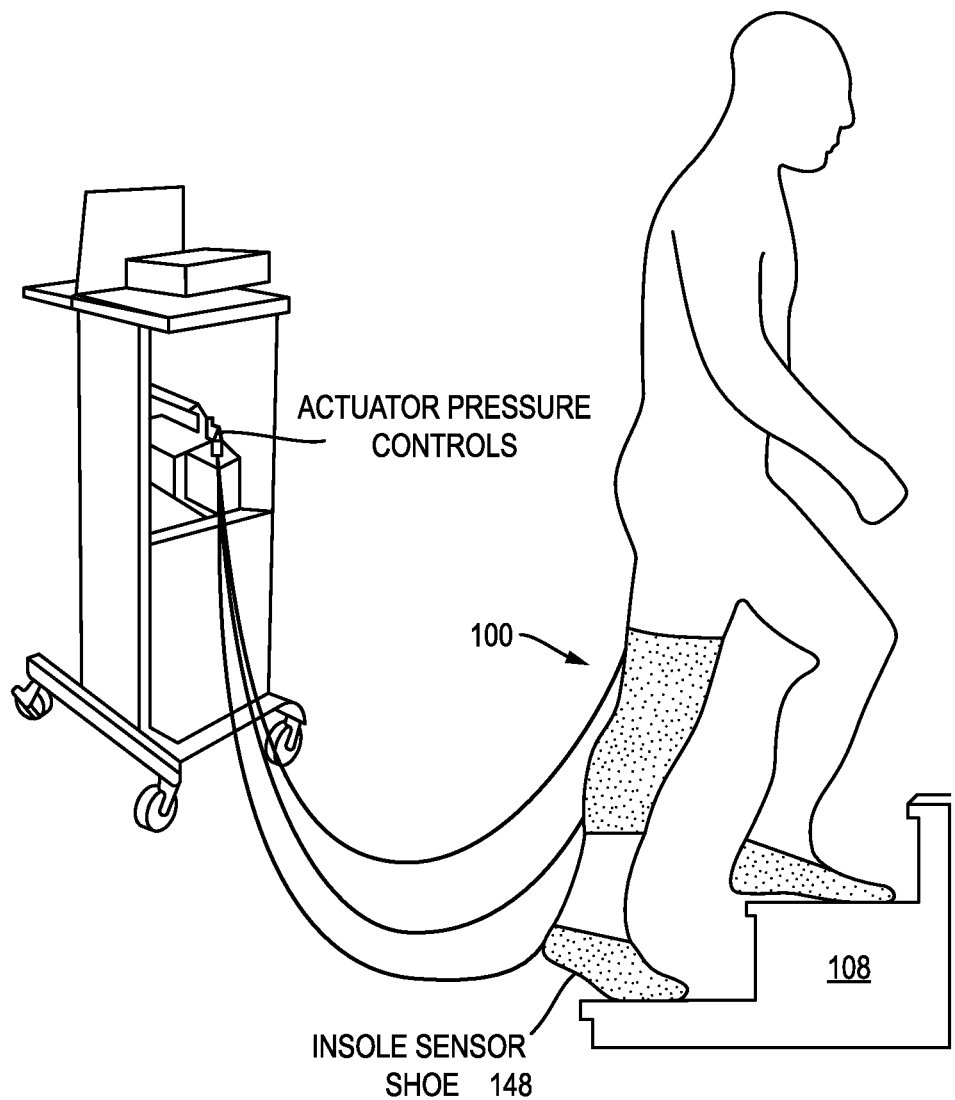
FIG. 2 shows another concept of a rehabilitative test setup done with a soft-inflatable knee exosuit.

With reference to FIG. 2, the soft inflatable knee exosuit 100 may also be worn to perform rehabilitation exercises on stairs (or a stair climber) 108. Stair Ascent (FIG. 2) is described for each stride normalized from 0% (i.e., first contact or heel strike) to 100% (i.e., subsequent contact of the same foot with the ground). Normal Stair Ascent (SA) includes both stance and swing phases. Studies of stair kinematics have revealed that the greatest Range of Motion (ROM) occurs in the sagittal Plane, with the amount of flexion, particularly at the knee, dependent on stair dimensions. Stair ambulation ROM at the knee requires approximately 10 to 20 degrees more knee flexion compared to that of level walking. Knee moments during stair ascent are also approximately 12 to 25 percent greater than that of level walking, with the largest moments occurring in the sagittal plane. A large amount of power/energy is produced at the knee joint during the stance phase.

The soft inflatable knee exosuit 100 may also be used by astronauts while in outer space as a form of physical exercise. The soft inflatable knee exosuit 100 may include just the sleeve 2, or may include a partial or full body suit (not shown). The soft inflatable knee exosuit 100 can adapt the user to a variety of gravity fields (e.g., Zero-G, Martian 0.38G, etc.).

Figure 3:
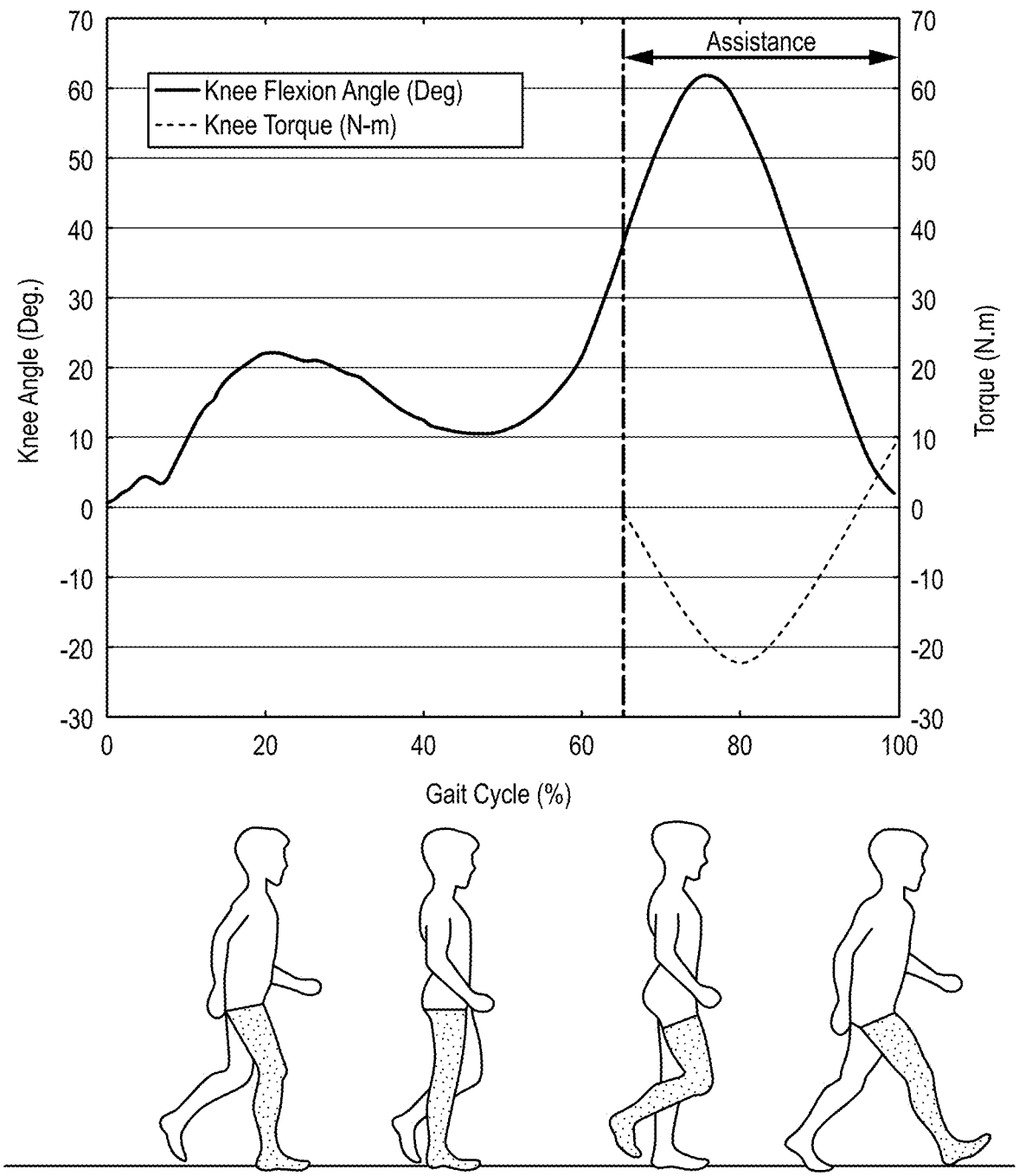
FIG. 3 shows exemplary knee flexion angles and torques during a swing phase of walking according to an embodiment of the disclosure.

The knee joint angles at all points and torques during the swing phase of walking were computed using inverse kinematics and dynamics. From the computed knee angles and the ground-reaction forces obtained from the treadmill 6, the stance and swing phases of the gait cycle were established. The stance phase was identified with the detection of heel strike and ended at toe-off. The remaining portion of the gait cycle is defined as the swing phase. The swing phase of walking was identified as ideal for providing knee joint extension assistance by aiding the quadriceps to complete the swing, as shown in FIG. 3. FIG. 3 shows exemplary knee flexion angles and torques during a swing phase of walking for the shaded leg at a speed of 1 m/s.

As shown in the graph portion of FIG. 3, the relationship between the knee joint torque and the knee angle can be modeled as a spring-damper system as shown in Equation (1):

$$T(s)=(Is^2+Bs+K)\theta(s) \quad (1)$$

where T is the torque, θ is the angle, I is the inertia, B is the viscosity and K is the stiffness of knee joint. Since the participant only walked at low-speed, the influence of the inertia and viscosity terms were not significant. The averaged swing knee stiffness values for a healthy subject walking at 0.5 m/s were determined to be 1.07 Nm/deg.

In can be noted that the knee joint in itself does not produce the torque, as in the case of motor driven exoskeletons. The forces generated in the joint are due to the action of the muscles contracting and relaxing, during motion. In a walking cycle, the peak torque generated during the swing phase of the leg was determined to be 22 N·m at a walking speed of 3 m/s. It can be noted that embodiments of the exosuit need to aid the user during rehabilitation and not completely assist the knee joint to perform rehabilitative activities. Therefore, having rehabilitation of the quadriceps and the limitations of soft robotics in mind, a partial assistance of 20% (4.4 N·m) was set as the required torque to be provided to the knee joint during the swing phase.

Figure 4:
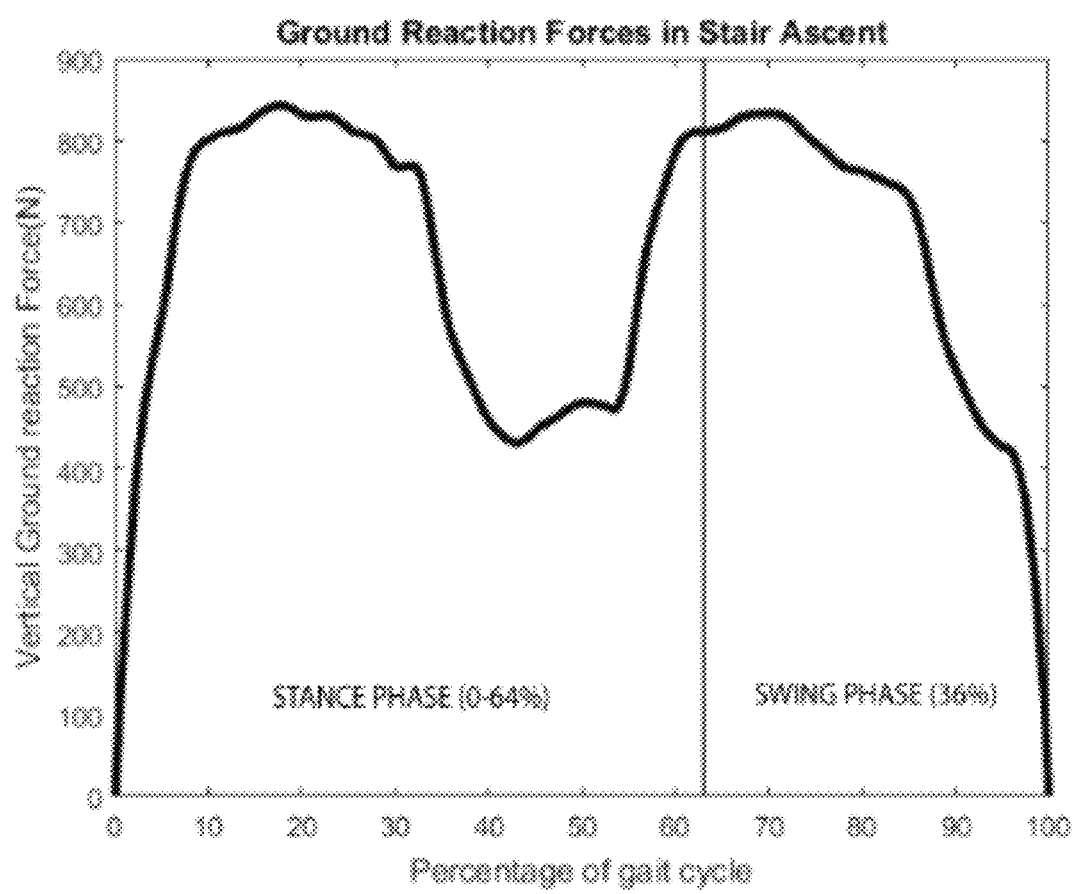
FIG. 4 shows an exemplary force and gait cycle relationship of the soft-inflatable knee exosuit according to an embodiment of the disclosure.

As shown in FIG. 4, at foot contact, a rapid increase in the vertical ground force reaction (GRF) may be observed, reaching the first of two maxima at the start of single limb support (17% SA cycle). Vertical GRF gradually decreases until mid-stance (34% SA cycle), after which it again increases, reaching its second maximum as double support is initiated (51% SA cycle). The magnitude of the medio-lateral shear component of the GRF (lateral GRF) increases from foot contact until single limb support (17% SA cycle), reaching the first of two maxima. Lateral GRF, like vertical GRF, gradually falls until mid-stance (34% SA cycle). After mid stance, it again increases, reaching its second maximum at the initiation of double support (51% SA cycle).

For a theoretical modeling of the soft-inflatable actuators, inspiration was drawn from the Euler-Bernoulli beam theory to design the soft-inflatable actuators that power the exosuit. Based on beam deflection theory we have Equation (2):

$$\frac{d^2}{dx^2}\left(EI\frac{d^2\omega}{dx^2}\right)=q \quad (2)$$

where, E is the elastic modulus and I is the second moment of area of the cross-section of the beam, the curve ω(x) describes the deflection of a beam in a direction perpendicular to the axis parallel to the length of the structure at position x, and q is the force per unit length. As per Equation (2), for a constant deflection, the elastic modulus E, and the moment of inertia I are directly proportional to the force causing the deflection. Therefore, for structures made from the same material, the deflecting force would depend on the moment of inertia, 1.

Figure 5:
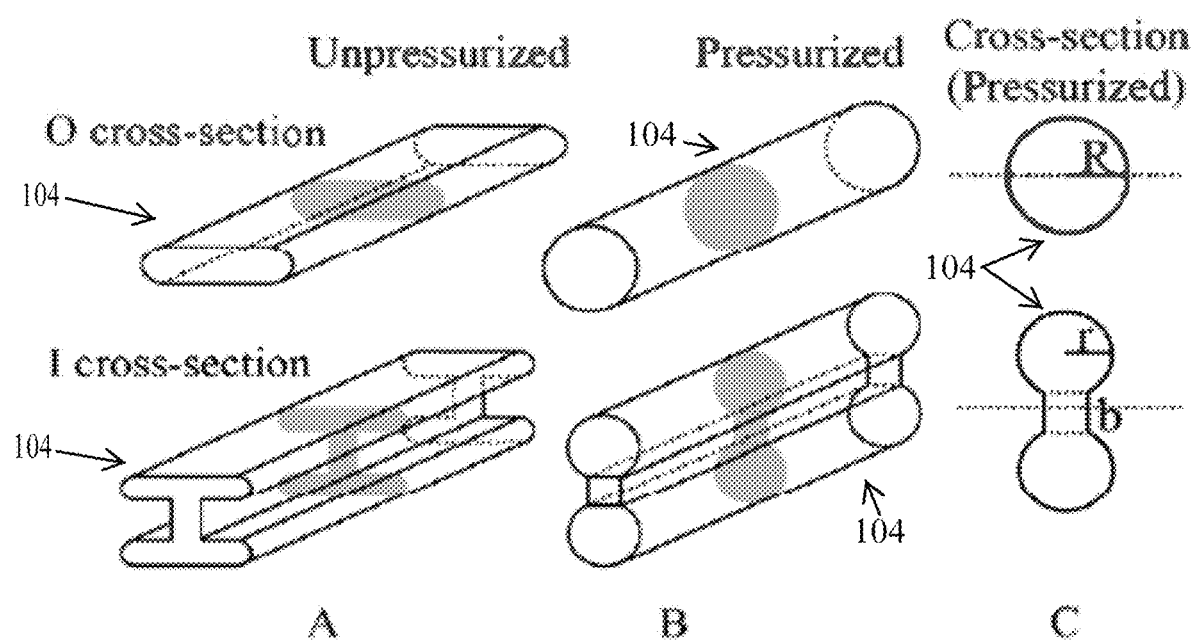
FIG. 5 shows a comparison of structural differences of exemplary design structures of inflatable actuators according to an embodiment of the disclosure.

Two types of structures, an I cross-section and an O cross-section, were investigated for comparison between the bending forces that can be resisted by the structures at the same internal pressure. It was hypothesized that the soft-inflatable design with the I cross-section would be able to withstand higher forces before buckling. FIG. 5 shows a comparison of structural differences of exemplary design structures of inflatable actuators 104 according to an embodiment of the disclosure. The embodiment shown in (A) shows an isometric view of a cross-section of the inflatable actuators in an uninflated, unpressurized state, the embodiment shown in (B) shows an isometric view of a cross-section of the inflatable actuators in an inflated, pressurized state, and the embodiment shown in (C) shows an inflated cross-section of the two types of actuators. As shown in (A), the O cross-section may have a single longitudinal member that may be oblong when unpressurized and cylindrical when pressurized. Similarly, the I cross-section may have multiple longitudinal members disposed parallel to each other and connected by a connecting member disposed perpendicular to the longitudinal members. The longitudinal members may be oblong when unpressurized and cylindrical when pressurized. As shown in (B) and (C), the cross sectional profile in soft structures changes when they are pressurized pneumatically. It should be noted that when unpressurized, the actuators cannot resist bending forces; but when pressurized, the cross-section and stiffness drastically change. As shown in (C), the inflated O cross-section is approximated to be circular while the inflated I cross-section is a combination of two circles and a square.

To compare the bending load of the two actuators, the total cross-sectional area and the length of each actuator were designed to be the same. Equation (3) shows the relation between the cross-sectional areas of the two actuators where R is the radius of the inflated O cross-section, r is the radius of the circles of the inflated I cross-section, and b is the side of the square:

$$\pi R^2 = 2\pi r^2 + b^2 \quad (3)$$

$$R = \sqrt{\frac{(2\pi r^2 + b^2)}{\pi}} \quad (4)$$

Figure 6:
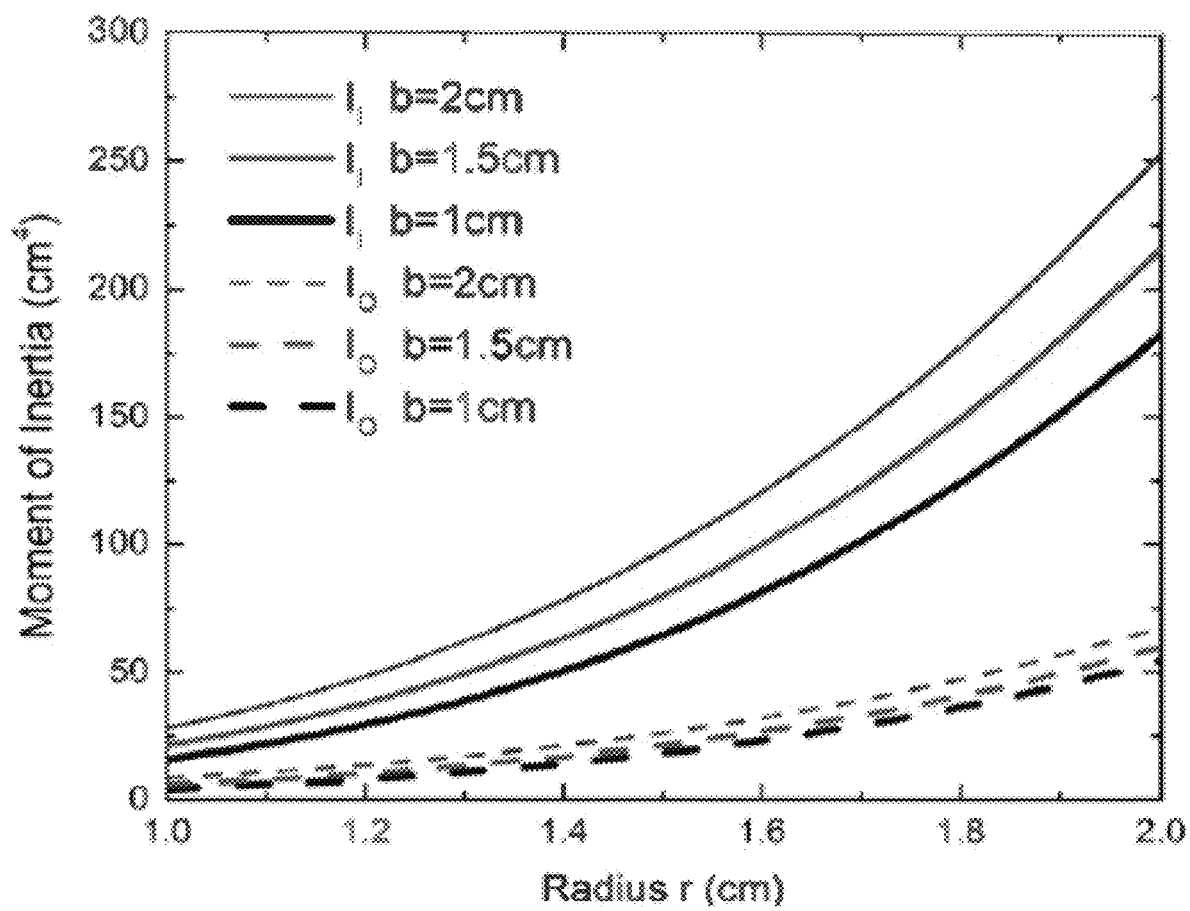
FIG. 6 shows exemplary simulated results showing the moment of inertia for cross-sections of the inflatable actuators according to an embodiment of the disclosure.

The radius of the O cross-section, R was written in terms of the parameters of the I cross-section, r and b to set a common ground between the two different cross-sections as shown in Equation (3). The moment of inertia, for both the cross-sections were computed using the parallel axis theorem and are shown here as Equations (5) and (6):

$$I_O = \frac{\pi}{4} R^4 = \frac{\pi}{4}\left[\frac{2\pi r^2 + b^2}{\pi}\right]^2 \quad (5)$$

$$I_I = \frac{5\pi}{2} r^4 + 2\pi b r^3 + \frac{\pi b^2}{2} r^2 + \frac{b^4}{12} \quad (6)$$

where, $I_O$ and $I_I$ are the moment of inertia for the O cross-section and I cross-section, respectively. When compared, $I_I$ was found to be greater than $I_O$ for all possible values of R, r, and b as illustrated in FIG. 6. FIG. 6 shows simulated results showing the moment of inertia for both cross-sections using the effective radius of the I and O cross-sections computed for possible values R, r, and b, where R is related to r and b, as shown in Equation (4).

Figure 7:
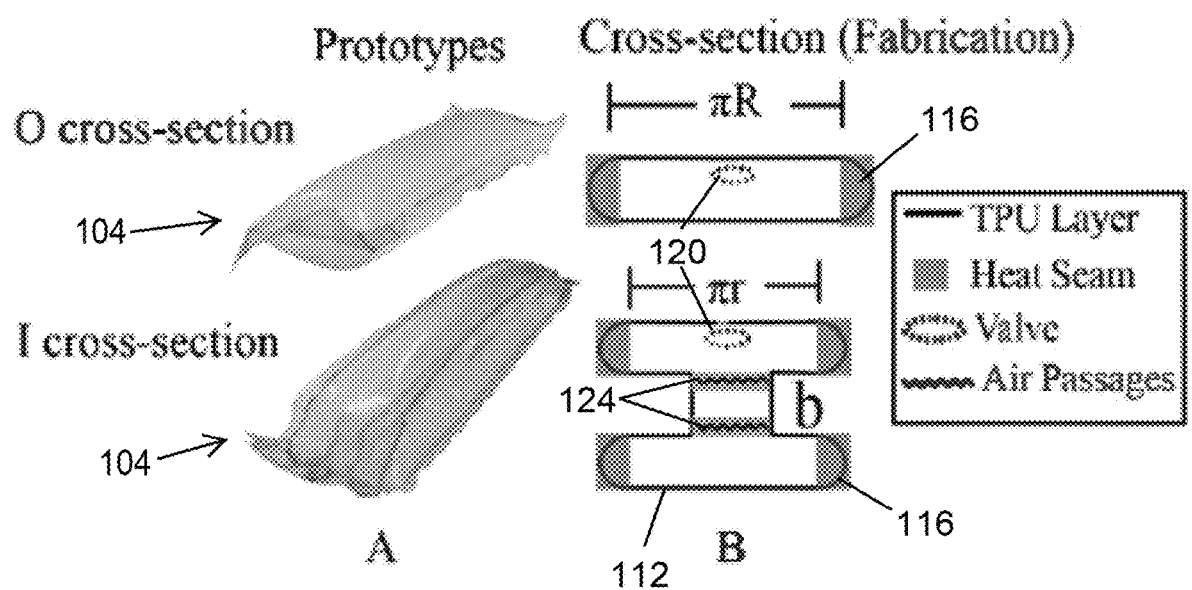
FIG. 7 shows exemplary prototypes and fabrication of cross-sections of the inflatable actuators according to an embodiment of the disclosure.

FIG. 7 shows exemplary prototypes and fabrication of cross-sections of the inflatable actuators according to an embodiment of the disclosure. Section (A) shows exemplary prototypes of the inflatable actuators with the O and I cross-sections. For the O cross-section embodiment, two pieces of thermoplastic polyurethane (TPU) layers 112 were heat sealed and/or adhered together on each of the four sides. In other embodiments the layers 112 may be made of material other than thermoplastic polyurethane. The layers 112 may be made of other suitable heat sealable and/or adhering materials. The fabrication of the I cross-section embodiment required additional steps where the material had to be folded and sealed multiple times to create an I cross-section and the center seams needed to be heat-sealed to keep the structure intact when inflated, as shown in Section (B). Also, provision for uniform distribution of pressurized air was provided. Both the ends of the actuator 104 are heat-sealed where tubing fittings are attached, for example, 2.5 cm from the sealed ends. As shown in FIG. 7, each cross-section can include one or more TPU layers 112, one or more heat seams 116, one or more valves 120, and one or more air passages 124. The air passages 124 act as channels were made to allow air to flow between layers 112 of the actuator 104 for uniform distribution of pressurized air throughout the material.

The chosen dimensions for the actuators may be based on the proportions of the femur and tibia for accurate fitting and the number of required actuators. For the following tests, values of R=1.94 cm, r=1.27 cm, b=1.27 cm, and a 25.4 cm actuator length were used in the construction of the inflatable actuator. The corresponding second moments of inertia, $I_O$ and $I_I$, are 2.94 cm$^4$ and 36.99 cm$^4$, respectively. It is noted that different values of R, r, and b can be used for modeling, as long as they satisfy the relationship in Equation (3). Inflatable actuators fabricated from two types of TPU materials were tested: 1) DT2001 with a thickness of 0.1524 mm (e.g., American Polyfilm Inc., Branford, Conn.), and 2) Stretchlon 200 with a thickness of 0.0381 mm (e.g., Fibre Glast Dev. Corps, Brookville, Ohio). Persons of ordinary skill in the art will, in view of the present disclosure, recognize and appreciate that in certain embodiments suitable materials and/or dimensions other than those expressly identified herein may be included depending on a variety of design considerations and contexts.

Figure 8:
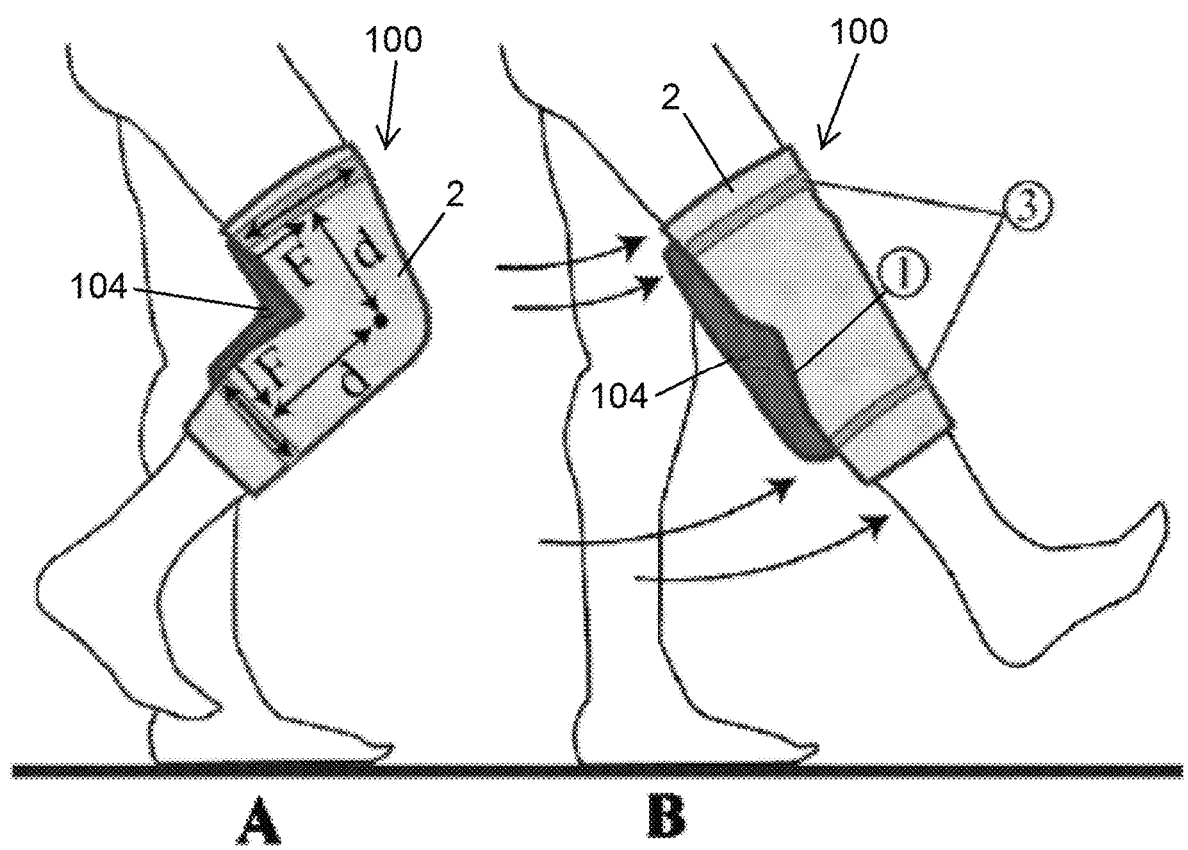
FIG. 8 shows an exemplary force and torque relationship of the soft-inflatable knee exosuit according to an embodiment of the disclosure.

FIG. 8 shows an exemplary force and torque relationship of the soft-inflatable knee exosuit 100 according to an embodiment of the disclosure. With physical rehabilitation assistance in mind, the soft-inflatable exosuit 100 was conceptualized to assist the user by providing knee-extension moment through attaching the inflatable actuators 104 behind the user's knee (the popliteal fossa or kneepit), as shown in FIG. 8. The embodiment of FIG. 8 shows three elements of the knee exosuit: the knee-sleeve 2, the inflatable actuators 104 within the pocket 1, and hook and loop straps 3. FIG. 8 (portion A) shows a user in mid-swing gait phase and a start of actuator inflation. FIG. 8 (portion B) shows a user at the end of the swing gait phase and completely inflated actuators. By strapping the actuators at a fixed length along the calves and the hamstring, they can provide the forces required to assist with the knee-extension motion. This assists the user from the mid-swing to the end of the swing phase of their gait cycle.

Figure 9A:
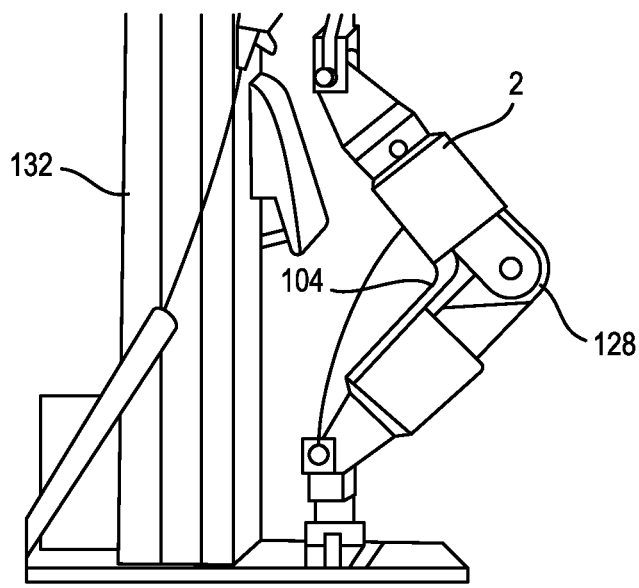
FIGS. 9A-9D show exemplary testing equipment and results of an evaluation of the soft-inflatable knee exosuit according to an embodiment of the disclosure.

FIGS. 9A-9D show exemplary testing equipment and results of an evaluation of the soft-inflatable knee exosuit 100 according to an embodiment of the disclosure. A biologically-inspired joint 128 was first fabricated to assist with simulating the biological knee joint. This knee joint 128 was assembled using two pieces made of acrylonitrile butadiene styrene (ABS) plastic (e.g., Fortus 450mc, Stratasys, Eden Prairie, Minn.) to mimic the femur and tibia of a human leg. The rotating joint of the test apparatus is designed to allow 135° of rotation, with ball bearings at the center of the joint for frictionless motion. The knee joint 128 was designed with provisions to attach the inflatable actuators 104 in different orientations for more exhaustive testing. To securely mount the actuator 104 to the knee joint 128, a fabric sleeve 2 for the actuator 104 was fitted with straps 3 to secure the actuator 104 at equal distances from the kneepit. FIG. 9A shows exemplary testing equipment and a setup for characterizing the soft-inflatable actuator 104. FIG. 9A shows a universal tensile testing machine 132, the bio-inspired knee joint 128, the sleeve packing for the inflatable actuator 2, and the inflatable actuator 104. To measure the force output from the inflatable actuators 104, the knee joint 128 was mounted securely on a universal tensile testing machine 132 equipped with a load cell (e.g., Instron 5944, Instron Corp., High Wycombe, United Kingdom) to capture the force data, as shown in FIG. 9A. The knee-extension angle on the test apparatus was set at 60° as per the maximum knee flexion angle during the swing phase of walking. For the tests, multiple force output readings were collected as the actuators 104 were inflated at intervals of 3.45 kPa.

Figure 9B:
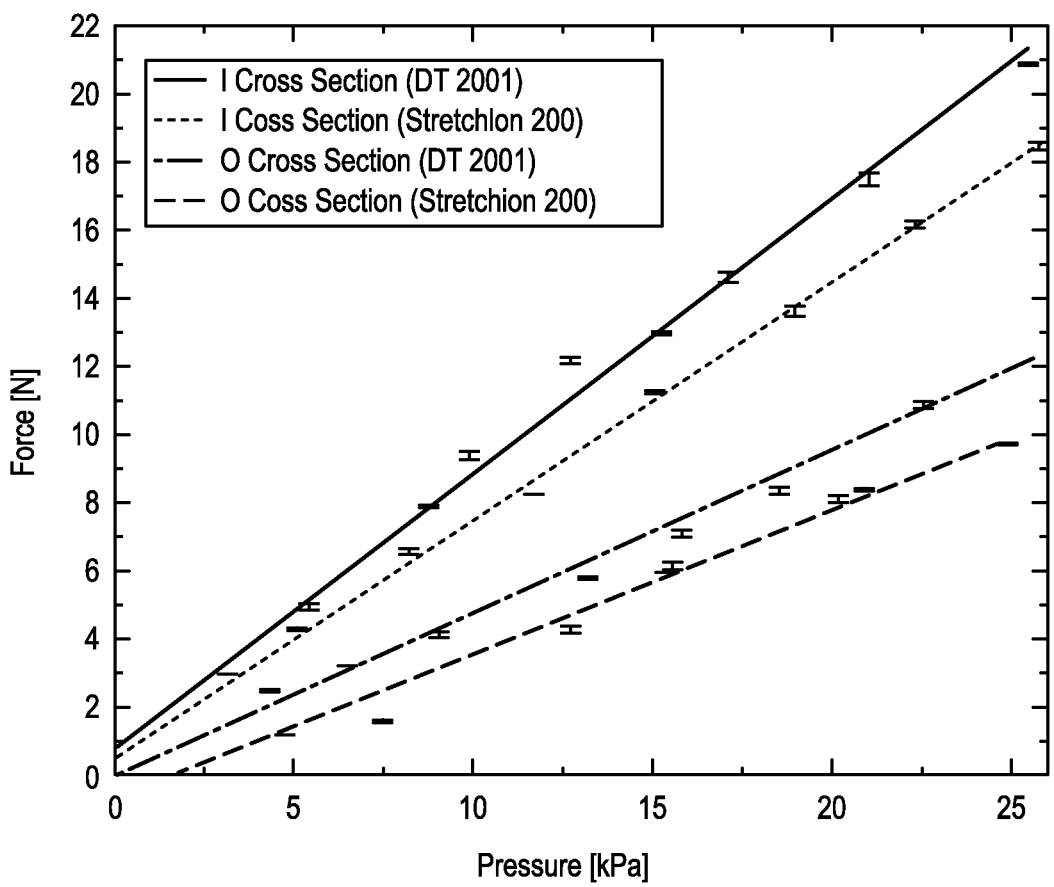

FIG. 9B shows a Force (N) vs. Pressure (kPa) graph of both I and O cross-sections made of DT2001 and Stretchlon 200 materials. As shown in FIG. 9B the DT2001 material provides better force output with increasing pressures and the actuator 104 with an I cross-section generates higher forces than the one with an O cross-section for the same material at the same pressure. It was also observed that the Stretchlon 200 material generates significant amounts of positional creep along the leg with increasing pressure, hence making the material not as suitable for this application. The torque exerted by the inflatable actuator 104 about the knee was computed by resolving the obtained forces from the universal testing machine 132 perpendicular to the surface of the test apparatus 128 and multiplying it with the moment arm of the force. It was determined that to produce a torque of 4.4 N·m, two actuators 104 supplied with 27.57 kPa would be required.

Figure 9C:
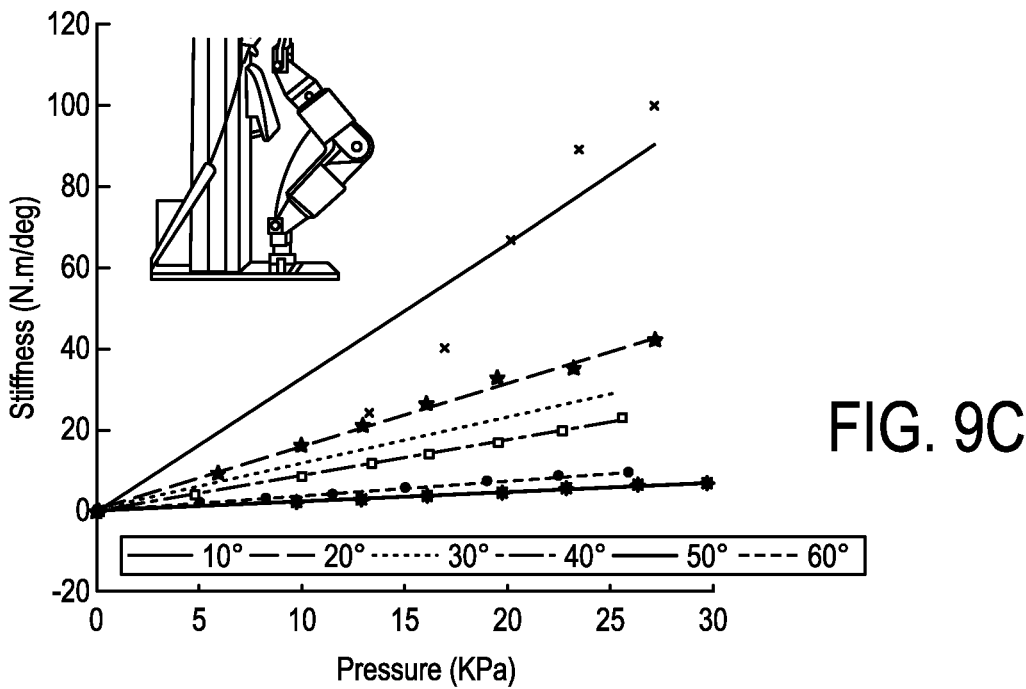
Figure 9D:
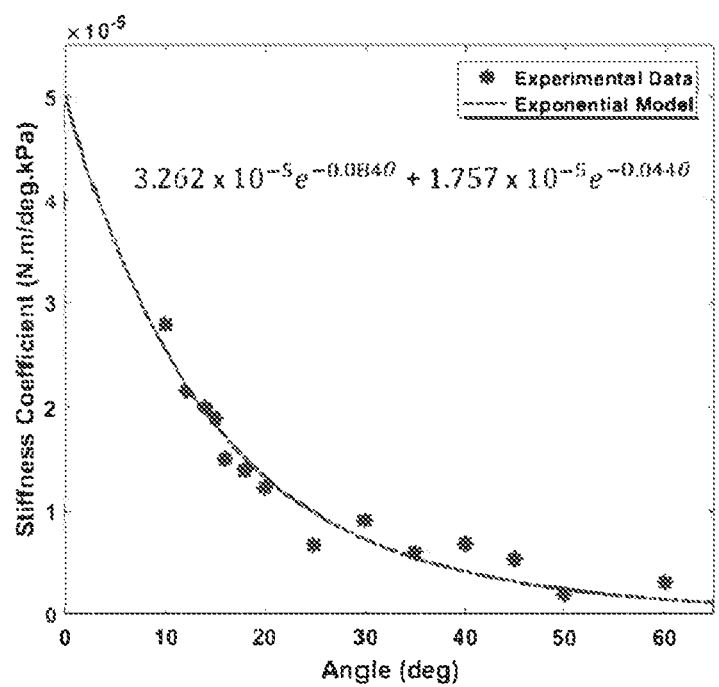

FIG. 9C shows a Stiffness (N·m/deg) vs. Pressure (kPa) graph for different knee-extension angles. The test apparatus 132 was set at different angles as per knee-flexion angles during the stance phase of stair climbing. For the tests, multiple force output readings were collected as the actuators 104 were inflated at intervals of 10 degrees by varying the pressure values from 0 to 27.58 kPa. The modeled relationship is linear. To compute the stiffness of the inflatable actuator 104 as a function of internal pressure, it was hypothesized that a relationship exists as shown in Equation (7):

$$S = K(\theta) * P \quad (7)$$

where S is the actuator stiffness, $\theta$ is the bending angle, and K ($\theta$) is the actuator stiffness coefficient as a function of the angle. Therefore, to determine K ($\theta$), as a function of the angle $\theta$, the slopes of the stiffness at the corresponding angle were derived and plotted against the angle, as shown in Section (D). An exponential model was fit to the data and was found to account for the high decline in the stiffness coefficient at low angles, and low decline during higher values of the knee flexion angle.

The torque exerted by the inflatable actuator 104 about the knee is computed by resolving the obtained forces from the universal testing machine, perpendicular to the surface of the test apparatus 132 and multiplying it with the moment arm of the force. It is determined that to produce a torque of 4.5 Nm actuators supplied with 28 kPa would be required.

Figure 10:
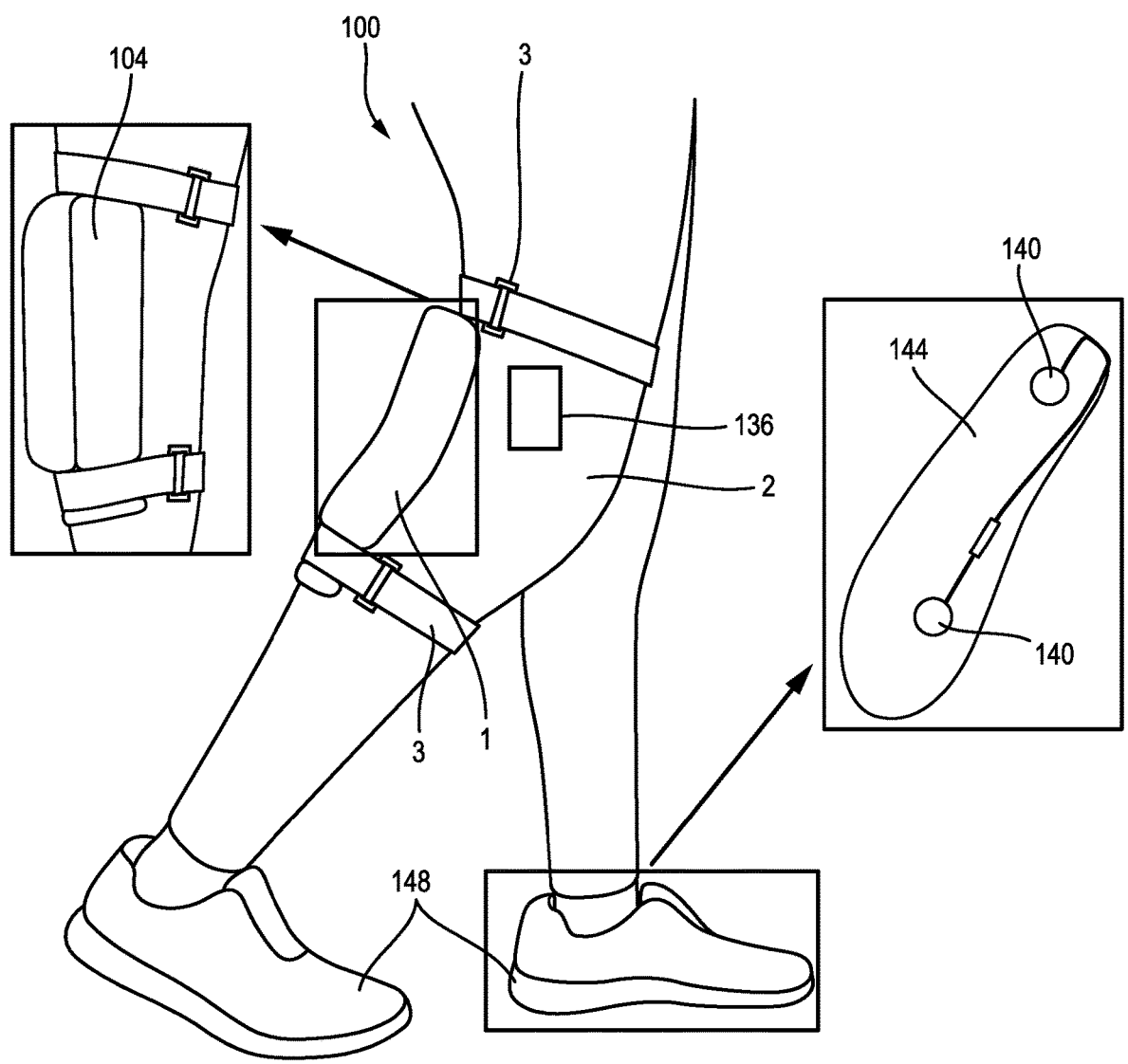
FIG. 10 shows a soft-inflatable knee exosuit according to an embodiment of the disclosure.

FIG. 10 shows an exemplary prototype of the soft-inflatable knee exosuit 100 according to an embodiment of the disclosure. In the embodiment shown, two inflatable actuators 104 are embedded inside the pocket 1 of the knee-sleeve 2 to assist with joint extension. An electronics pouch 136 is attached onto the knee-sleeve 2 and two force-sensitive resistors (FSRs) 140 are embedded into soft-silicone insoles 144 placed inside a user's shoes 148. In other embodiments, the FSRs 140 may be cast into solf-silicone insoles 144. The knee-exosuit 100 can be designed to be light-weight (e.g., 160 g with the onboard electronics) and body-conforming to the user's knee. The material used for its manufacture can be an elastic fiber (neoprene) that allows for maximum body conformity when flexing the knee. Along the neoprene knee-sleeve 2, an inelastic fabric pocket 1 can be sewn and aligned at a fixed length from the kneepit to house, separately, two inflatable actuators 104. These pockets 1 allow for rapid switching of the actuators 104 in cases of failure due to permanent deformation or rupture. The exosuit 100 can be additionally secured to the user's leg with one or more hook and loop straps 3. This allows the wearer to adjust the tightness around the thigh and calves to eliminate unwanted slippage of the exosuit 100 while walking.

Two FSRs 140 can be placed and casted into a thin (e.g., 4.5 mm), soft-silicone insole (e.g., Ecoflex 30, Smooth-On Inc., Macungie, Pa.) that is inserted inside the wearer's shoe. In the illustrated embodiment, one sensor 140 is located at the ball of the foot to measure the toe-off forces while the other is at the heel to measure heel-strike forces. In other embodiments, it may be useful to increase the number of FSRs 140 placed on the insole 144 at locations corresponding to the $1^{st}$ and $5^{th}$ metatarsals, the ball of the foot, and/or the heel for users that walk with alternate foot placement strategies. An algorithm may be used to average the output information from the additional sensors in order to utilize the data for gait detection to control pressurization of the actuators 104. An additional small fabric pocket 1 can be sewn on the knee sleeve 100 to incorporate any required monitoring electronics. The electronics may include a microcontroller with links to a custom board that facilitates connections to the insole sensors, valves controller, and fluidic pressure sensor. The electro-pneumatics of the systems may include three pneumatic valves (e.g., MHE3-MS1H valves, Festo, Hauppauge, N.Y.) that can be placed in series to control venting of air pressure during pressurization or depressurization. A single fluidic pressure sensor (e.g., ASDXAVX100PGAA5, Honeywell International Inc., Morris Plains, N.J.) can be added to the system to monitor the internal pressure of the inflatable actuators. The actuators 104 can be pressurized using a pneumatic line that is connected to a pneumatic supply source and/or a vacuum pump (e.g., DV-85N-250 pump, JB Industries, Aurora, Ill.), which facilitates faster depressurization rates (e.g., at 0.00142 cubic m/s).

The soft-inflatable exosuit 100 can provide assistance to the user's knee joint starting from the mid-swing (beginning of the inflation of the actuators) to the end of the swing phase of the gait cycle. Starting from the loading or heel-strike, the actuators 104 deflate and allow the user free knee-joint motion. The soft-inflatable exosuit 100 uses the FSRs 140 of the insole 144 to detect when a knee-extension moment is required to tell the soft inflatable exosuit 100 when to inflate, deflate, or hold the pressure in the actuators 104 accordingly.

To validate the effectiveness of the inflatable exosuit to assist with rehabilitation exercises during normal walking, surface electromyographic (sEMG) sensors (e.g., Delsys® Trigno®, Delsys, Natick, Mass.) were placed at the quadriceps of a healthy participant, after the skin was treated with rubbing alcohol solution. The sensors were placed at the rectus femoris, vastus lateralis, and vastus medialis, of the quadriceps to record muscle activation with and without the exosuit. The vastus intermedius muscle of the quadriceps is not considered in the testing as it lies closer to the skeletal structure and its operation cannot be captured using sEMG sensors.

A test protocol was formulated where the participant would walk on an instrumented treadmill 6 (FIG. 1) for three minutes per trial, at a set speed of 0.5 m/s, was applied. Post the completion of a trial, the participant was allowed to rest for five minutes to recover from any fatigue that might have occurred in the muscles. Safety measures such as emergency stops and quick deflation of the exosuit were also incorporated in case of any discomfort caused to the test subject.

Additionally, a safety factor was incorporated into the maximum bladder pressure in order to prevent bladder eruption.

Figure 11:
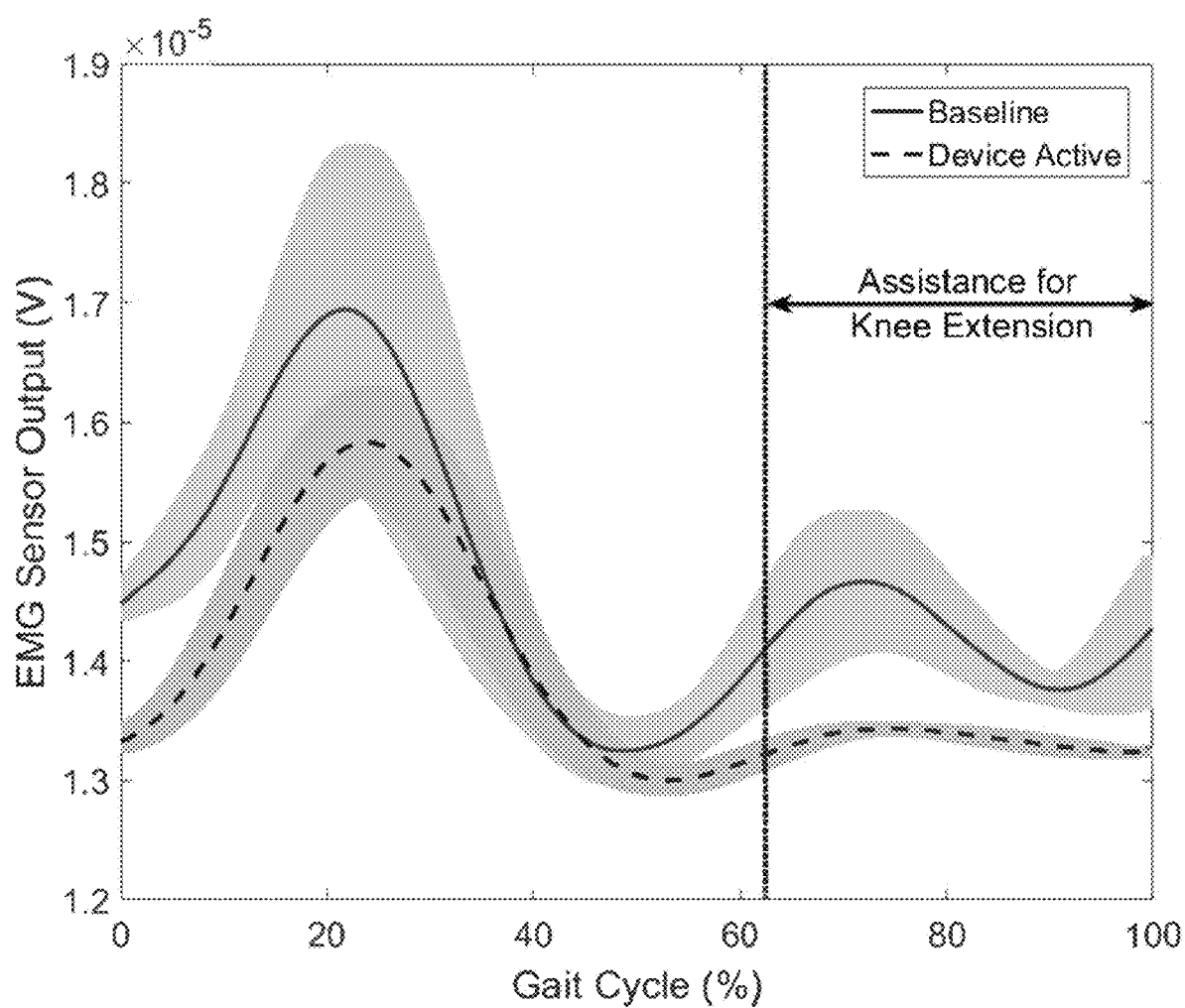
FIG. 11 shows exemplary testing results of an evaluation of the soft-inflatable knee exosuit according to an embodiment of the disclosure.
Figure 12A:
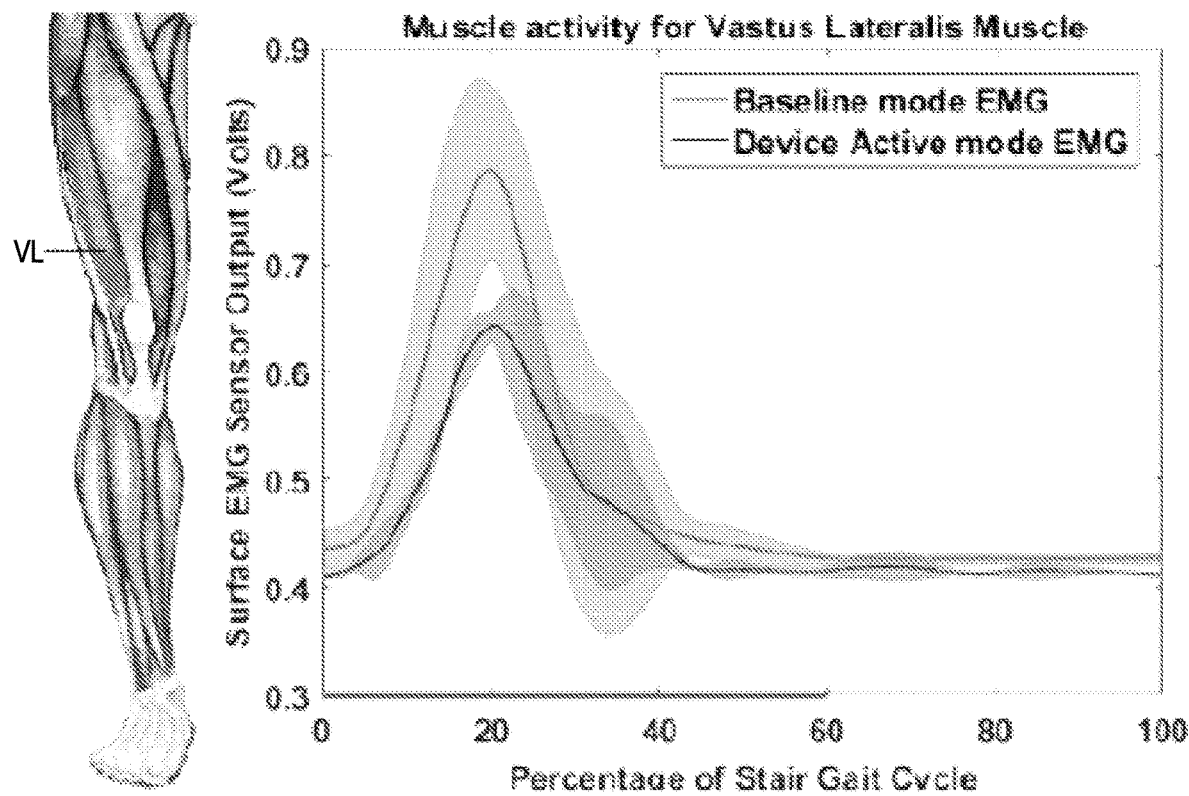
FIGS. 12A-12C show an exemplary sensor activity and gait cycle relationship for different muscles of a first user activated by the soft-inflatable knee exosuit according to the embodiment of FIG. 10.
Figure 12B:
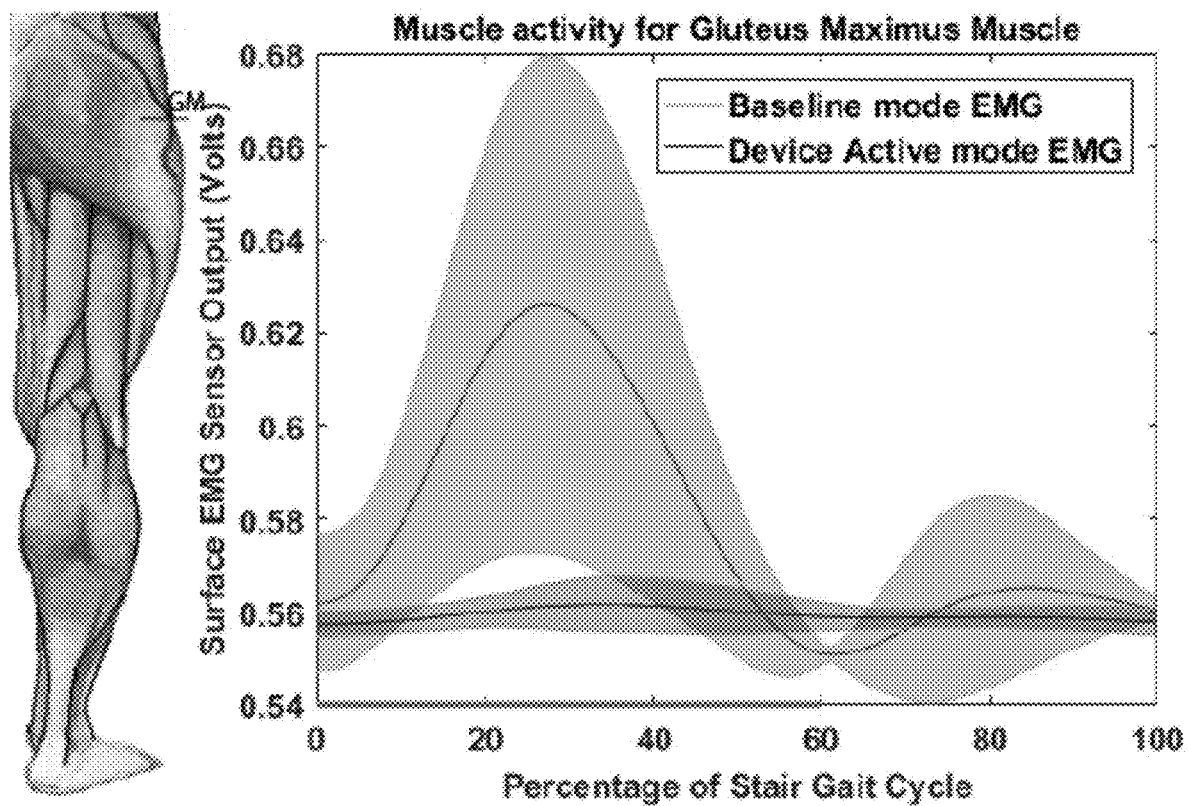
Figure 12C:
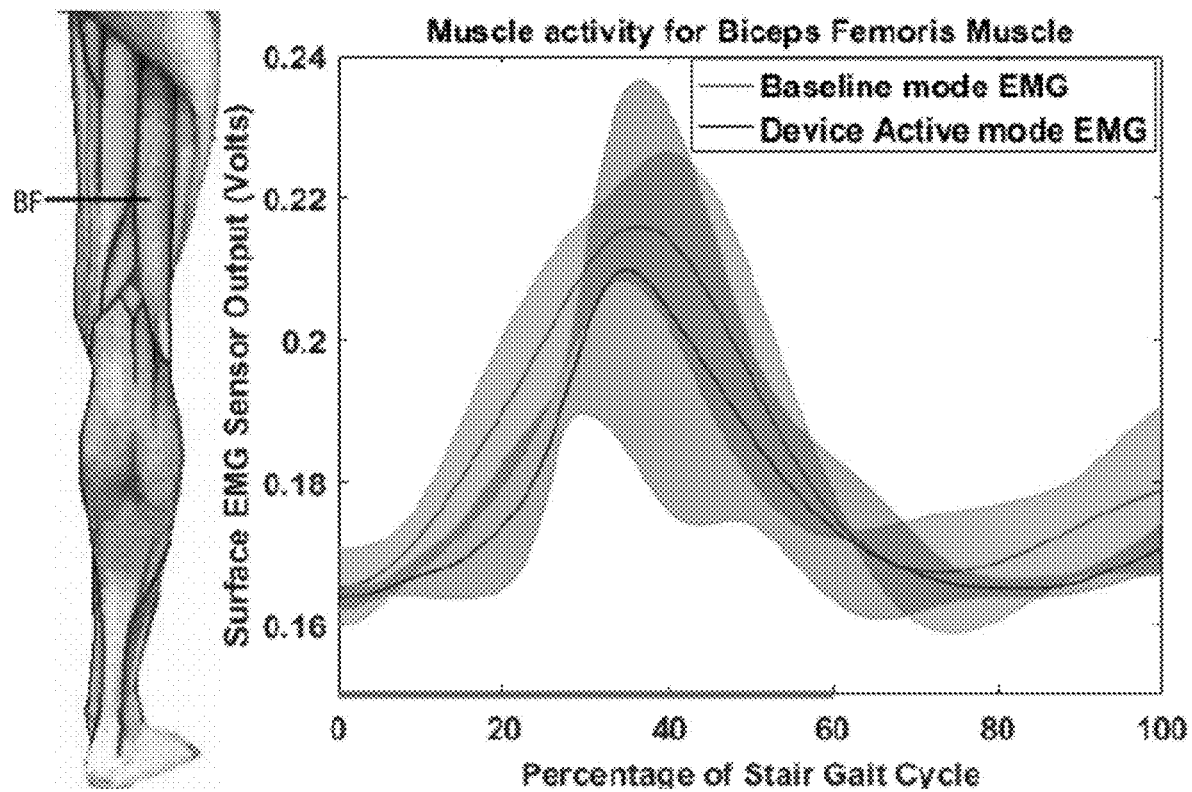
Figure 13A:
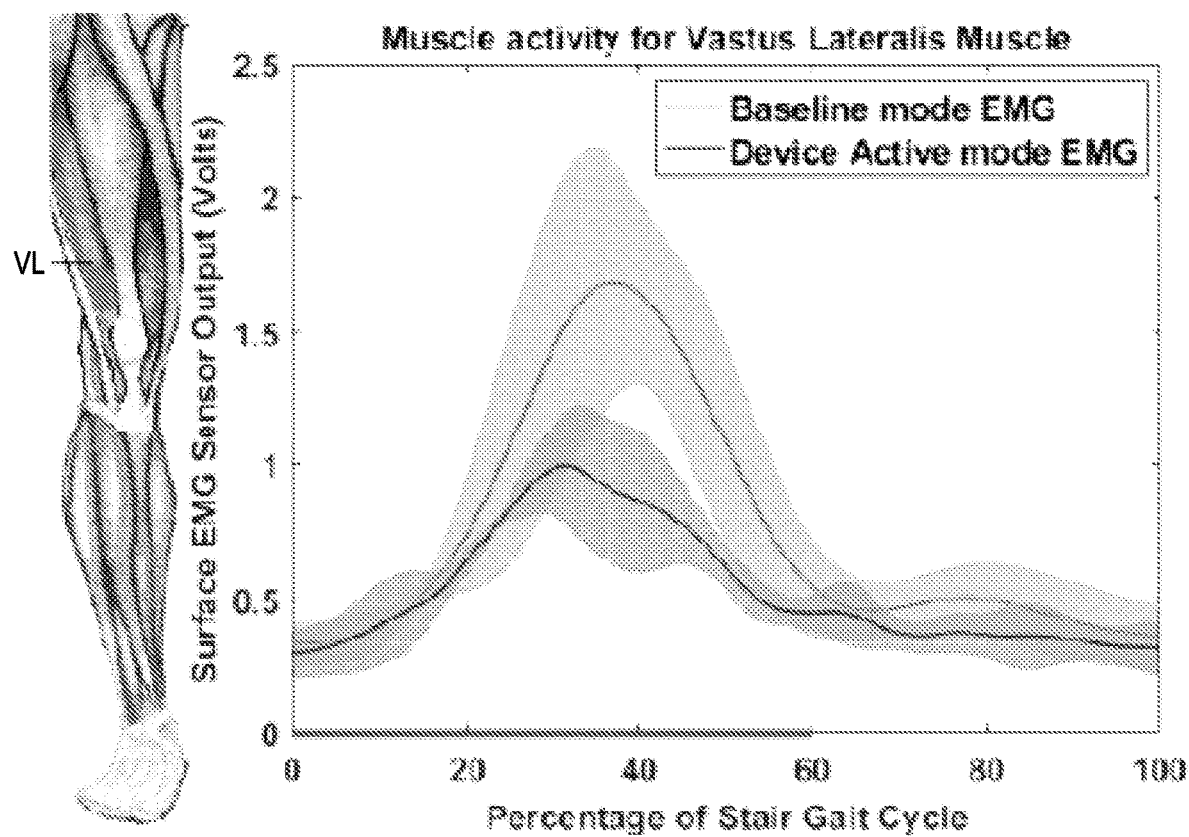
FIGS. 13A-13C show an exemplary sensor activity and gait cycle relationship for different muscles of a second user activated by the soft-inflatable knee exosuit according to the embodiment of FIG. 10.
Figure 13B:
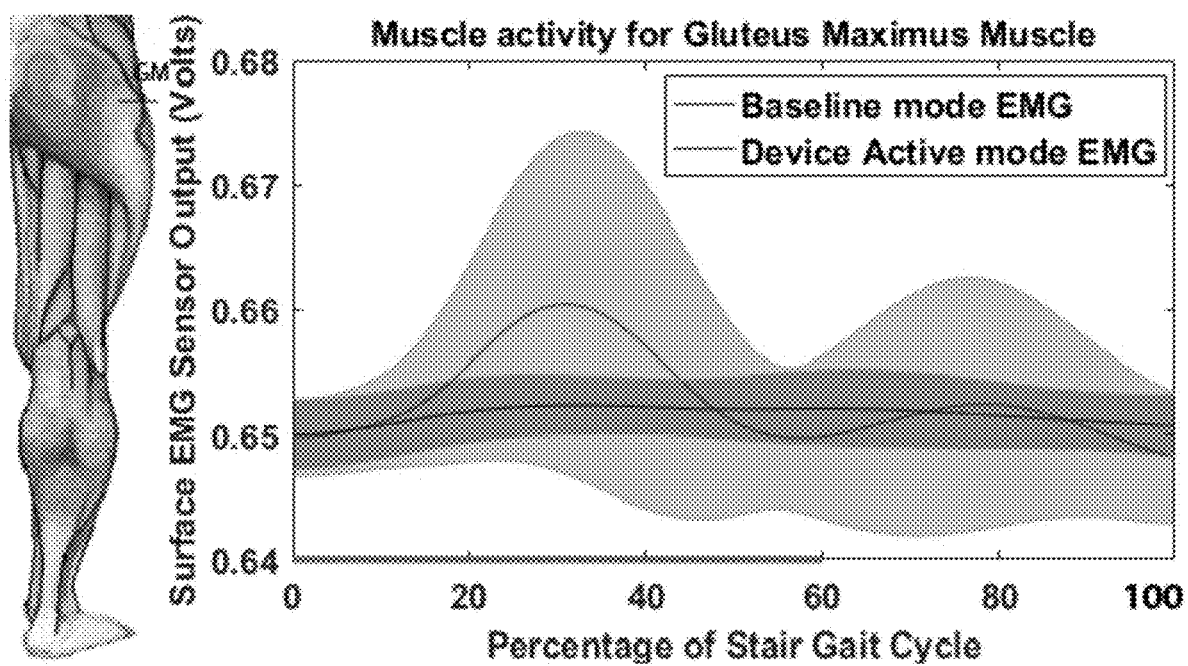
Figure 13C:
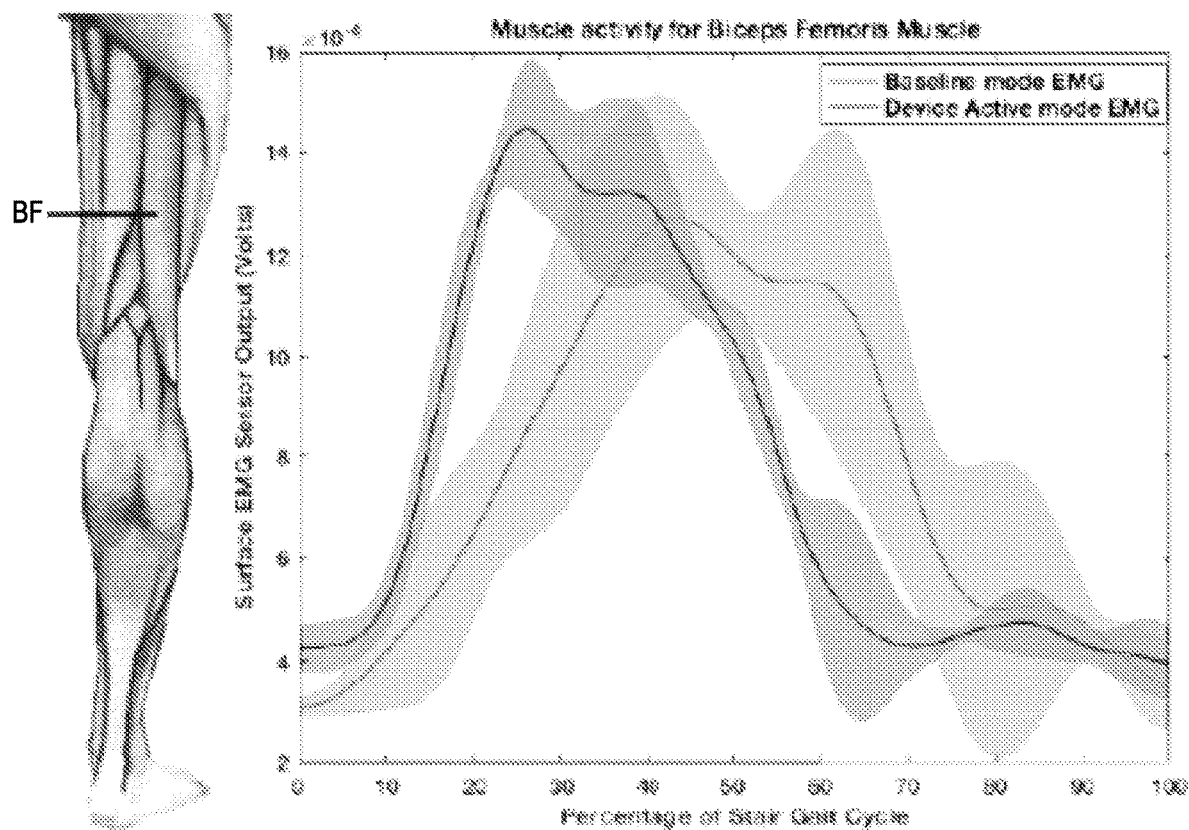

A total of six trials were performed on a single participant—three with the exosuit (Device active) and three without the exosuit (Baseline) following the aforementioned study protocol. The sEMG data collected during trials was processed to compare the effect of the exosuit on the gait cycle. Five gait cycles were averaged for both the Baseline and the Device active test for the rectus femoris muscle group and plotted along with their standard deviation, as seen in FIG. 11.

Processing of the sEMG data shows a reduction in muscle activity of 7% in the rectus femoris muscle group during testing with the exosuit active, while the other muscle groups show reductions with lower percentages. The three sets of data pertaining to one single participant demonstrate consistent results with all sets of data having similar amounts of reductions. A promising reduction in the muscle activity of the rectus femoris muscle group was also observed.

To validate the effectiveness of the inflatable exosuit 100 to assist with rehabilitation exercises during SA, sEMG sensors were placed on the biceps femoris, the vastus lateralis, and the gluteus maximus of healthy participants, after the skin was treated with rubbing alcohol solution. The sensors collected data for two participants while the device was on the user but inactive (i.e., baseline), and while the inflatable exosuit 100 is active (i.e., device active mode). A total of six trials were performed on a single participant—three with in the inflatable exosuit 100 active mode and three with in the baseline mode.

A test protocol was formulated where the participants would walk on a rehabilitative stair 108 (e.g., with having a width of 30 inches, risers of 7 inches, and a tread of 10 inches) for about three minutes per trial, at a very slow speed of about 0.5-1.0 m/s. Post completion of a trial, the participant could rest for two minutes to recover from any fatigue that might have occurred in the muscles. Safety measures such as emergency stops and quick deflation of the exosuit were incorporated in case of any discomfort caused to the test subject.

Figure 14:
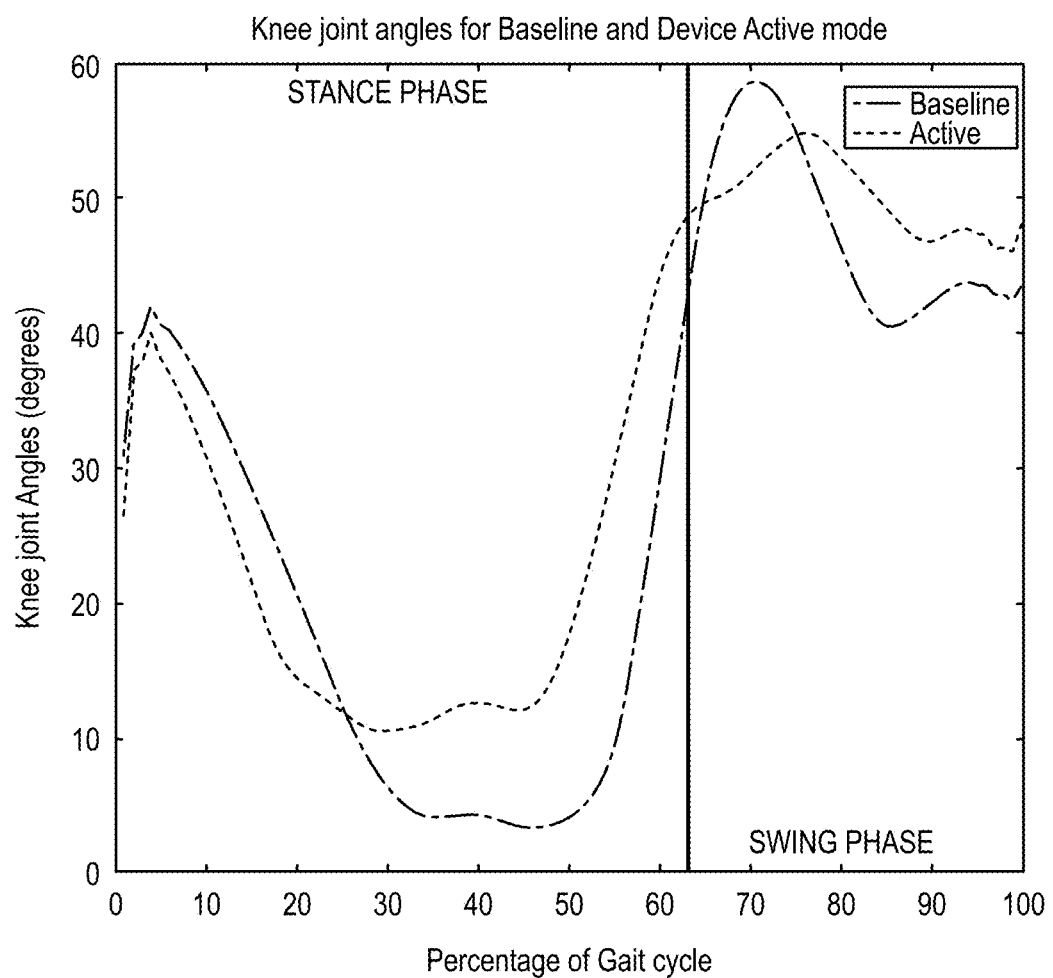
FIG. 14 shows an exemplary angle and gait cycle relationship of the soft-inflatable knee exosuit according to an embodiment of the disclosure.

FIGS. 12A-13C depict the normalized sEMG activity for the Vastus lateralis, the Gluteus maximus, and the Biceps femoris muscles respectively for two different users during the baseline and device active modes. Processing of the sEMG data showed reduction in muscle activity of different muscle groups. Specifically, there was a reduction of muscle activity of 16% in the Vastus lateralis and of 3.7% in the Gluteus maximus muscle group during testing with the exosuit 100 active. The three sets of data pertaining to one single participant demonstrate consistent results with all sets of data having similar amounts of reductions. A promising reduction in the muscle activity was observed. Additionally, joint angles of a knee wearing the inflatable exosuit 100 in device active mode closely mirrors joint angles of a knee wearing the inflatable exosuit 100 in baseline mode (FIG. 14).

Figure 15:
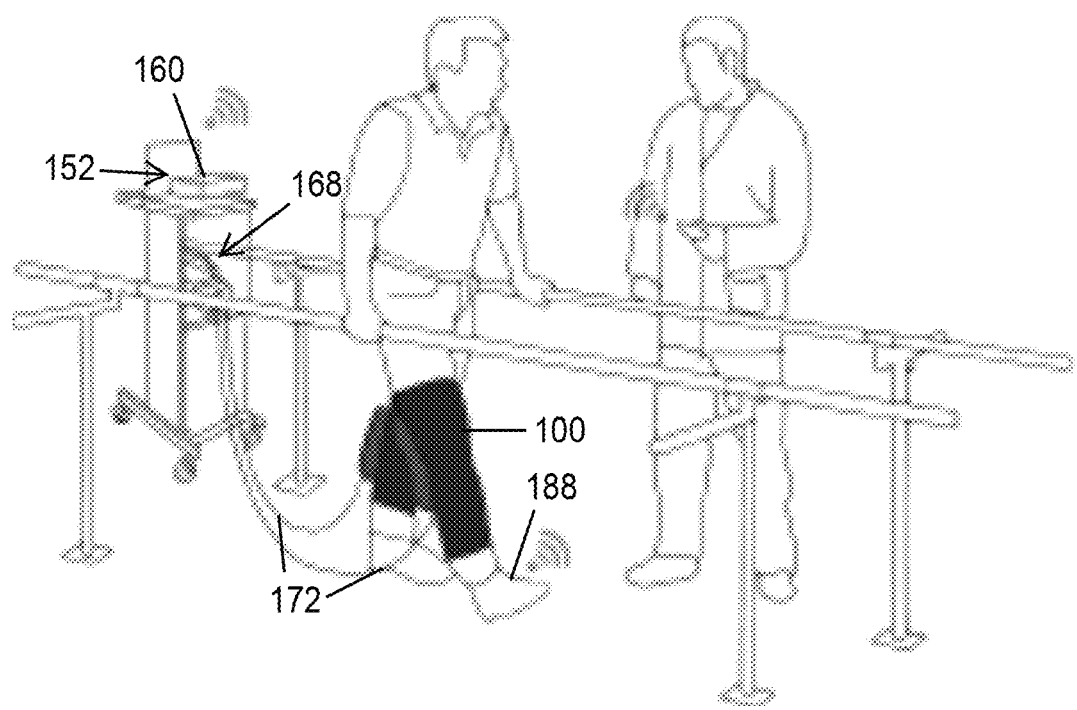
FIG. 15 shows another concept of a rehabilitative test setup done with a soft-inflatable knee exosuit that uses an off-board control unit.
Figure 16:
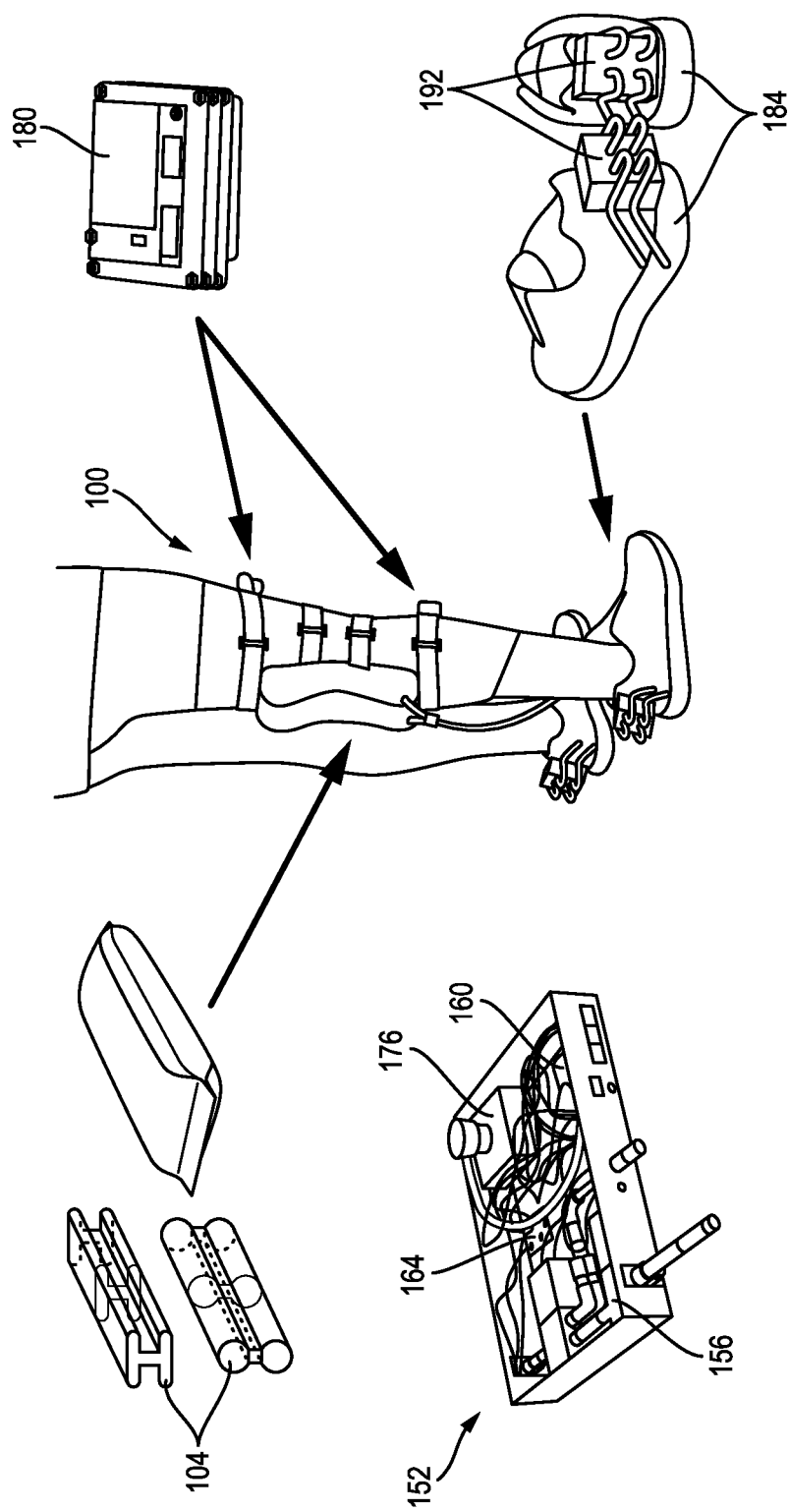
FIG. 16 shows the various sub-assemblies of the soft-inflatable knee exosuit of FIG. 15.

In another embodiment, as shown in FIGS. 15 and 16, the pneumatic system and the electro-mechanical components used in the exosuit 100 are stowed in an off-board setup. As shown in FIG. 16, a control unit 152 utilizes off-the-shelf components to provide actuation for the exosuit 100. The control unit 152 is equipped with high-speed/high-flow solenoid valves 156 (MHE3-MS1H valves, Festo, Hauppauge, N.Y.). In the illustrated embodiment, the solenoid valves 156 operate at a maximum frequency of 200 Hz with a volume flow rate of 100 L/min. The solenoid valves 156 are controlled using a micro-controller 160 (e.g., Raspberry Pi 3, Raspberry Pi Foundation, United Kingdom), integrated pressure sensors 164 (ASDXAVX100PGAA5, Honeywell International Inc., Morris Plains, N.J.) to measure the pressure inside the inflatable actuators 104, and voltage regulators to provide appropriate power supply to the components. Additionally, an external air compressor is used to provide positive pressure air supply to the actuators 104 while and a vacuum pump 168 (FIG. 15) (DV-85N-250 pump, JB Industries, Aurora, Ill.) is connected to the exhaust valves 172 (FIG. 15) to assist with the deflation of the soft actuators 104. The vacuum pump 168 allows for the rapid deflation of the actuators 104 during certain phases of the gait cycle.

An external alternating current (AC) supply is also used to power the control unit 152 and all of the components. Fittings are added to the system to attach and detach the exosuit 100 to the control unit 152, and also allow for the transportation of all the components if required. An emergency stop 176 switch is also incorporated to provide a fail-safe mechanism for the electro-pneumatic components and to protect the end user, as required by the institutional review board (IRB).

Two internal measurement units (IMUs) (LSM9DSO) 180 and a wireless gait monitoring system 184 (e.g., smart shoes) are also provided. These nine degree-of-freedom (DOF) IMU sensors 180 are composed of a three DOF gyroscope, a three DOF accelerometer, and a three DOF magnetometer. To estimate the knee joint angle, the IMUs 180 are placed in parallel with the femur and tibia. After aligning the IMUs' 180 coordinate frames, a knee joint angle is calculated by comparing roll angles between the two IMUs 180. In the illustrated embodiment, the roll angle estimation is sampled at 100 Hz and broadcasted through a secure wireless ad-hoc network, which utilizes dedicated slave 188 (Intel Edison, Intel, USA) and the Raspberry Pi 3 (Raspi 3) 160 master micro-controllers.

Figure 17:
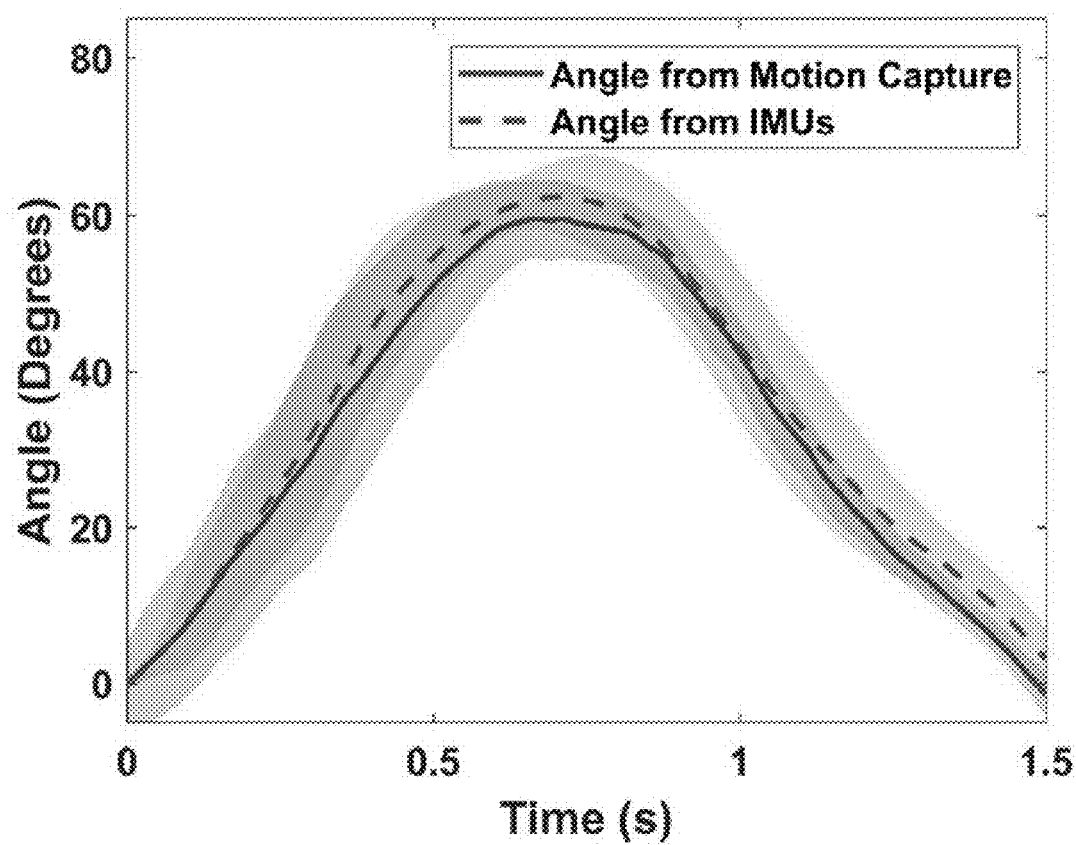
FIG. 17 shows an exemplary angle and time relationship of the soft-inflatable knee exosuit according to the embodiments of FIGS. 1 and 15.

To determine the accuracy of the knee angle measurement system, the IMUs 180 are mounted onto the tibia and femur of a 3D printed artificial knee joint. As seen in FIG. 17, the knee angle measured with the IMUs 180 accurately tracks the knee angle obtained using the VICON system (e.g., motion capture cameras (FIG. 1)), with a root-mean-squared deviation (RMSE) of 0.19°.

Returning to FIG. 16, an insole of the smart shoe 184 contains four coils (not shown) attached to the bottom of a shoe sole in order to provide contact at four different points on the feet (e.g., heel, toe, the first metatarsal and fourth metatarsal joint). The coils may be made from silicone tubing. Each of the coils is sealed on one end and the other end is connected to an air pressure sensor 192 which reads the change in pressure when the coil is compressed. After calibration, the pressure variation is mapped and broadcast over a wireless network. The smart shoe 184 may be more accurate and stable over a long duration of use, as compared to the system using FSRs 140.

Figure 18:
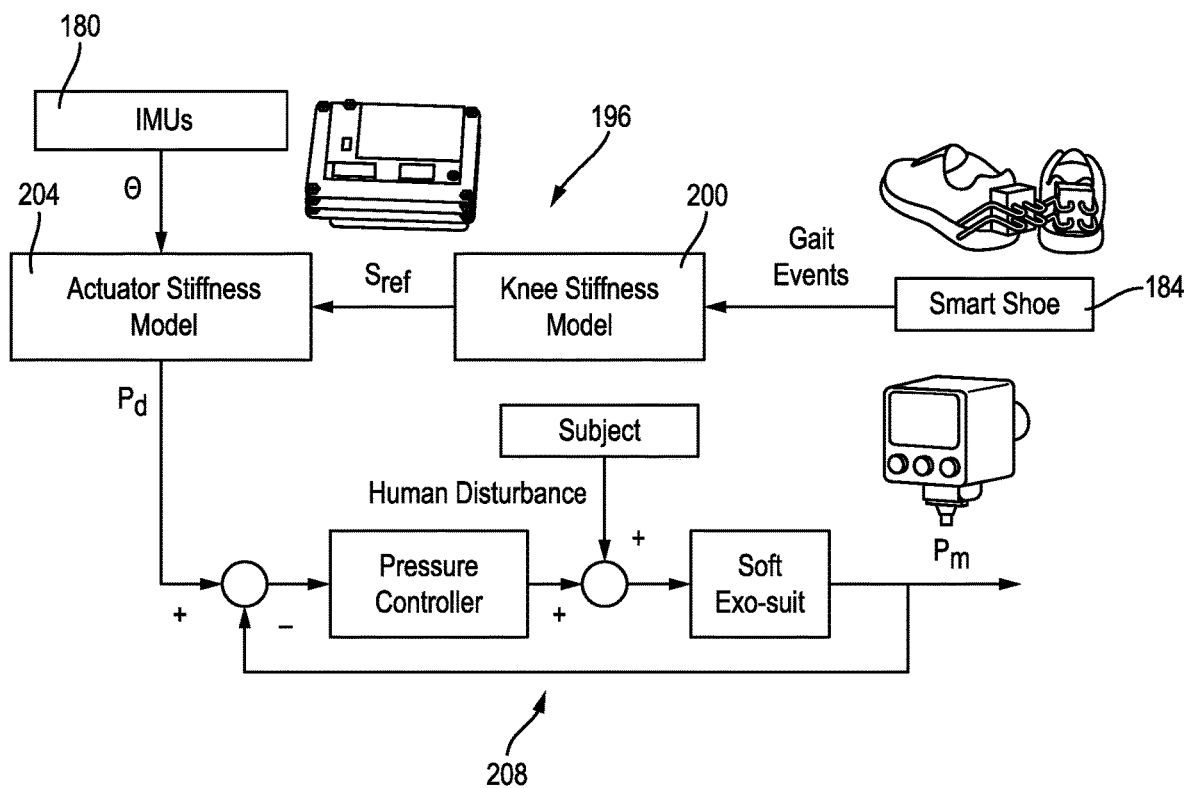
FIG. 18 shows a control scheme of controlling the soft-inflatable knee exosuit of FIG. 15.

As shown in FIG. 18, a two-layer control algorithm is used to tune a stiffness of the actuator 104 and provide appropriate physical assistance. A first layer 196 of the control algorithm is a high-level controller that takes measurements from the smart shoes 184 and IMUs 180 as inputs and generates a pressure reference to provide a 25% physical assistance at all times during the swing phase. The smart shoes provide estimations of the gait phases in real time. The human knee stiffness value varies in different gait phases. With the gait information provided by smart shoe 184, the stiffness reference $S_{ref}$ of soft exosuit 100 is calculated through the knee stiffness model 200. Taking the stiffness reference and knee angle θ measured by IMUs 180 as inputs, the desired pressure value $P_d$ is calculated using the actuator stiffness model 204.

A second layer 208 is a low-level pressure controller, which consists of the electro-pneumatics and the inflatable actuators 104 (FIG. 16). The low-level controller 208 is a closed-loop system which utilizes the feedback from the pressure sensor connected to the inflatable actuators 104, to attain the desired pressure defined by the high-level controller 196 at every instant. A binary control algorithm is used to control the actuator to reach the desired pressure.

Figure 19:
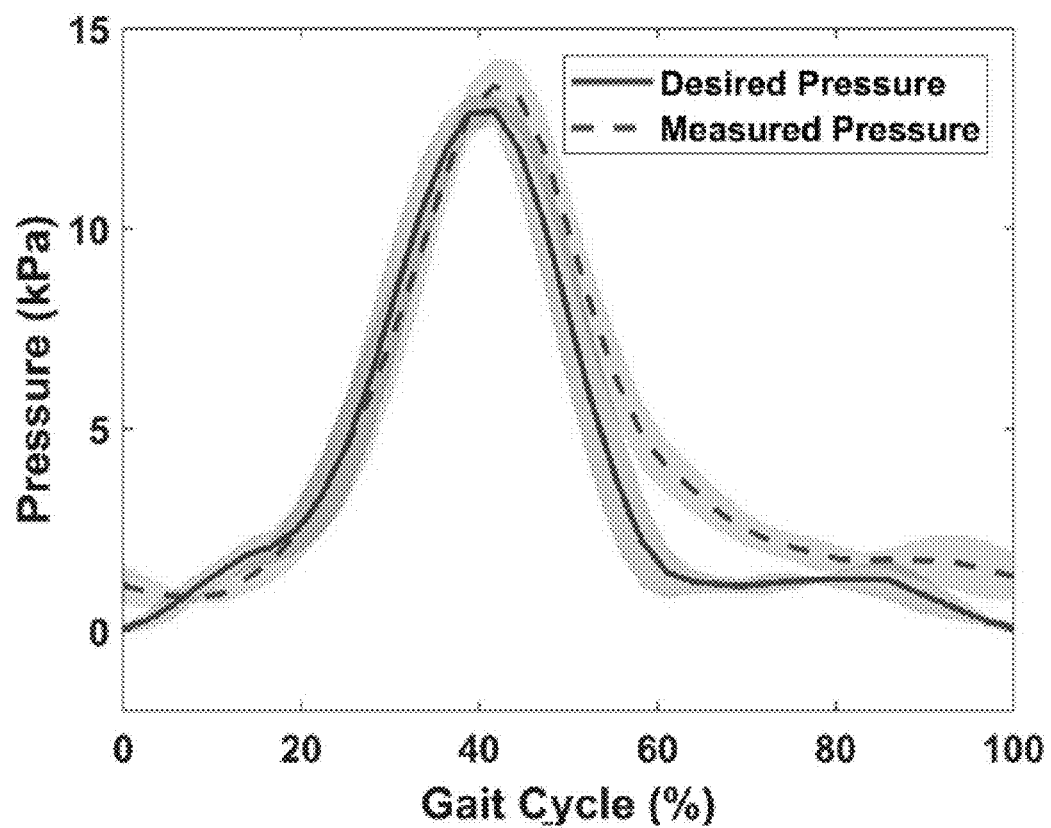
FIG. 19 shows an exemplary pressure and gait cycle relationship of the soft-inflatable knee exosuit according to the embodiments of FIG. 15.

FIG. 19 quantifies the performance of the low-level pressure control 208 of the soft exosuit 100, by comparing the desired pressure calculated by the high-level control system 196 and the actual pressure measured by the pressure sensor. It is observed that during inflation, the actuator 104 closely follows the desired pressure profile, while during deflation there exists a delay. This is because the flow rate is directly proportional to the pressure gradient leading to lower exhaust rates at lower pressures. Other contributing factors may include the constant suction rate of the vacuum pump 168 (FIG. 15) in combination with the small in diameter pneumatic exhaust ports and lines 172 (FIG. 15).

Figure 20:
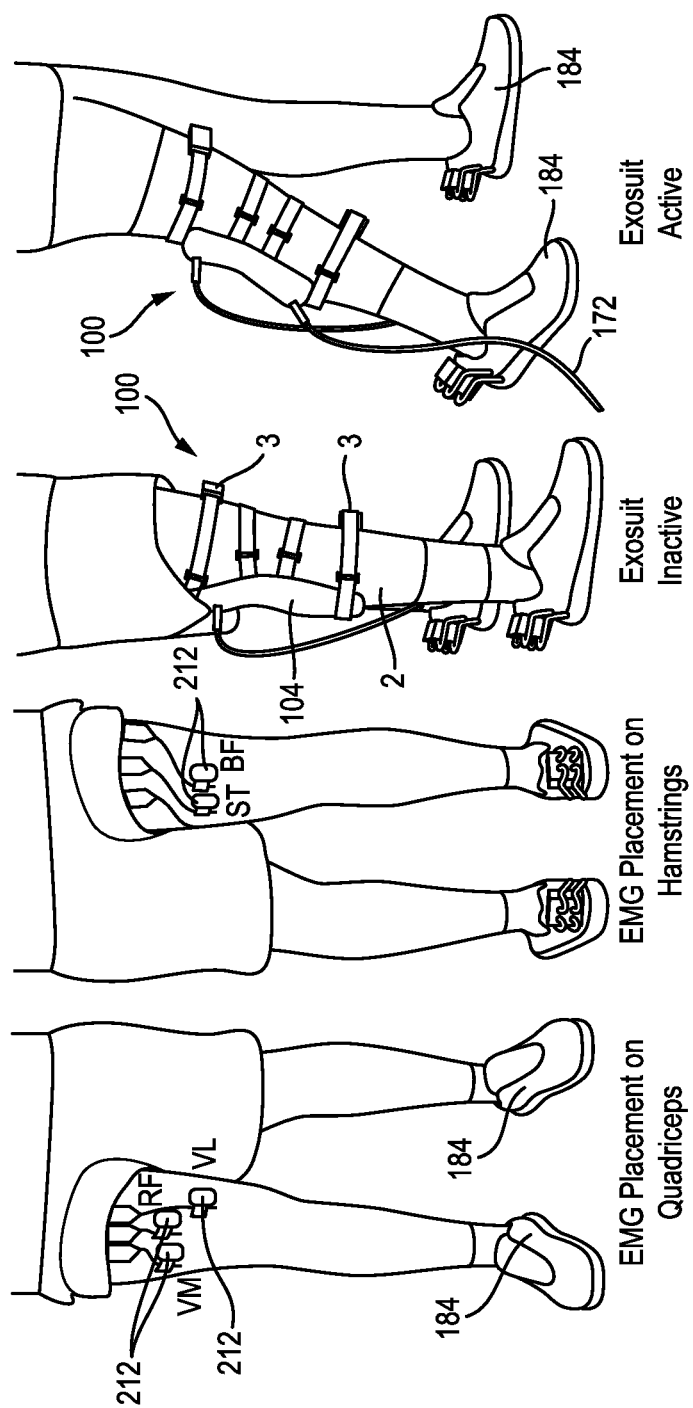
FIG. 20 shows sensor placement and phases of the soft-inflatable knee exosuit of FIG. 15.

As shown in FIG. 20, five sEMG sensors 212 are placed on the user at the rectus femoris (RF), vastus lateralis (VL), vastus medials (VF), biceps femoris (BF) and the semitendinosus (ST) muscle groups of the quadriceps and hamstrings, as shown. The maximum voluntary muscle contraction (VMC) and the resting activity of the individual muscle groups is recorded to set the signal limits and offsets.

A walking test procedure of the protocol included two phases; one, with the exosuit 100 donned, but not active (baseline), and the second with the exosuit 100 donned and active (active). For both phases, the elastic compressing sleeve 2, where the soft inflatable actuators 104 are mounted on, was worn over the sEMG sensors 212. In this way, the same uniform pressure was applied to the sEMG sensors 212 during both the baseline and active phases of the study, allowing for fair comparison between signals from the sEMG sensors 212. The baseline was performed with the inflatable exosuit 100 already donned on the user, as studies indicated that elastic compression sleeves 2, such as the one used in the exosuit 100, were designed to increase proprioception of the joint and not to restrict or enhance physical performance.

The non-impaired adult participants walked on an instrumented treadmill 6 with the sEMG sensors 212 attached to the aforementioned muscle groups. The participants walked on the treadmill 6 for three minutes at a slow speed of 0.5 m/s, followed by a rest period of five minutes between the baseline and active phases. Each of the test phases was performed three times to ensure accuracy of the collected muscle data (i.e., a total of six times for both baseline and device active).

To compare signals from the sEMG sensors 212 from the exosuit inactive and exosuit active tests, five gait cycles from the same time intervals for each set were averaged. These gait cycles were selected from the middle one minute of the total length of each trial. This was performed to ensure that the user gets accustomed to the exosuit in the first one minute and also to eliminate any effects that may arise due to the participant adapting to the external forces exerted by the exosuit.

Figure 21A:
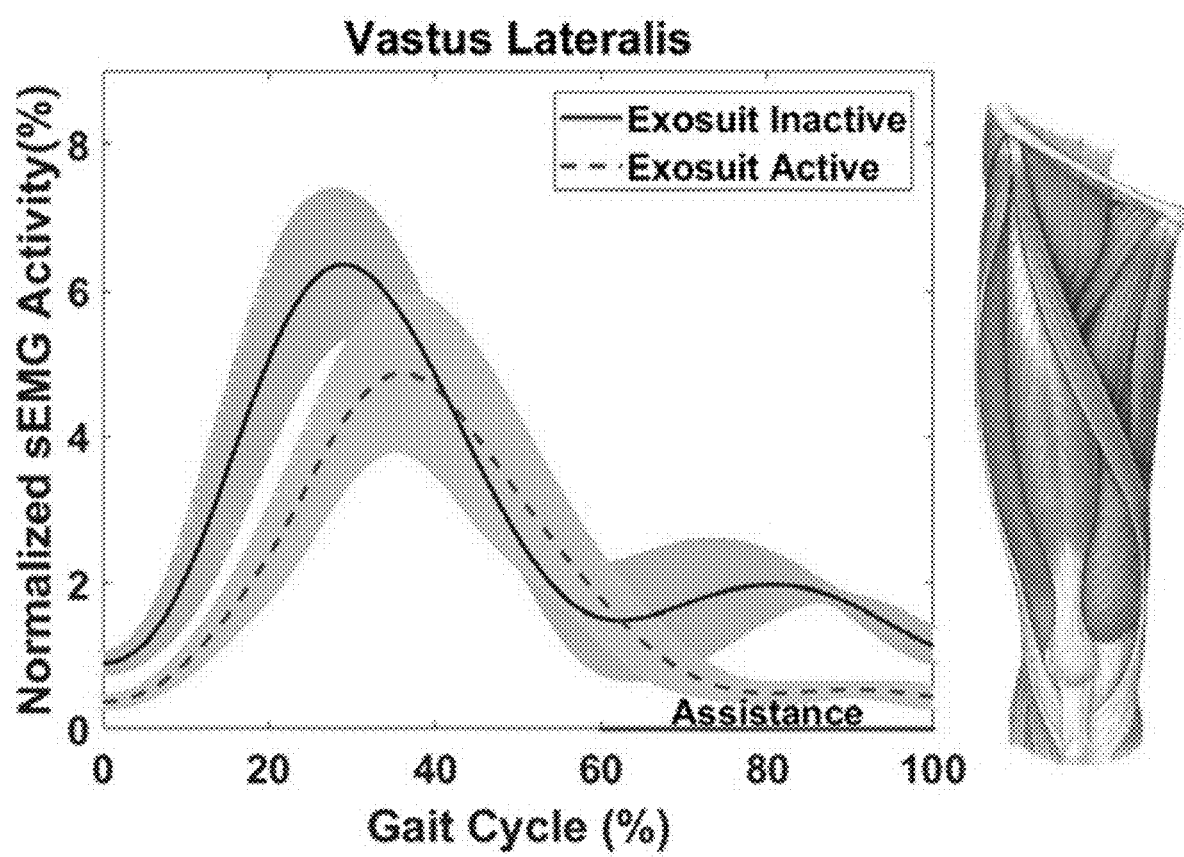
FIGS. 21A-21F show an exemplary sensor activity and gait cycle relationship for different muscles activated by the soft-inflatable knee exosuit according to the embodiment of FIG. 15.
Figure 21B:
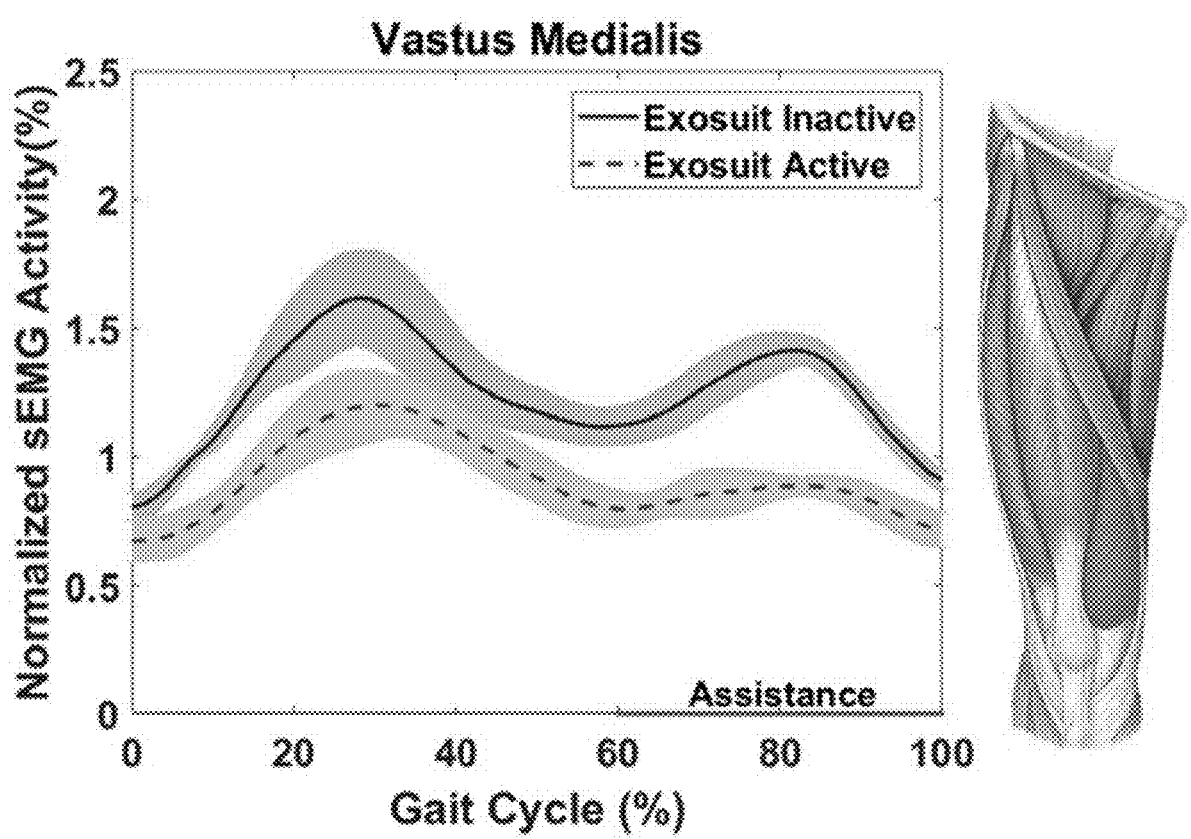
Figure 21C:
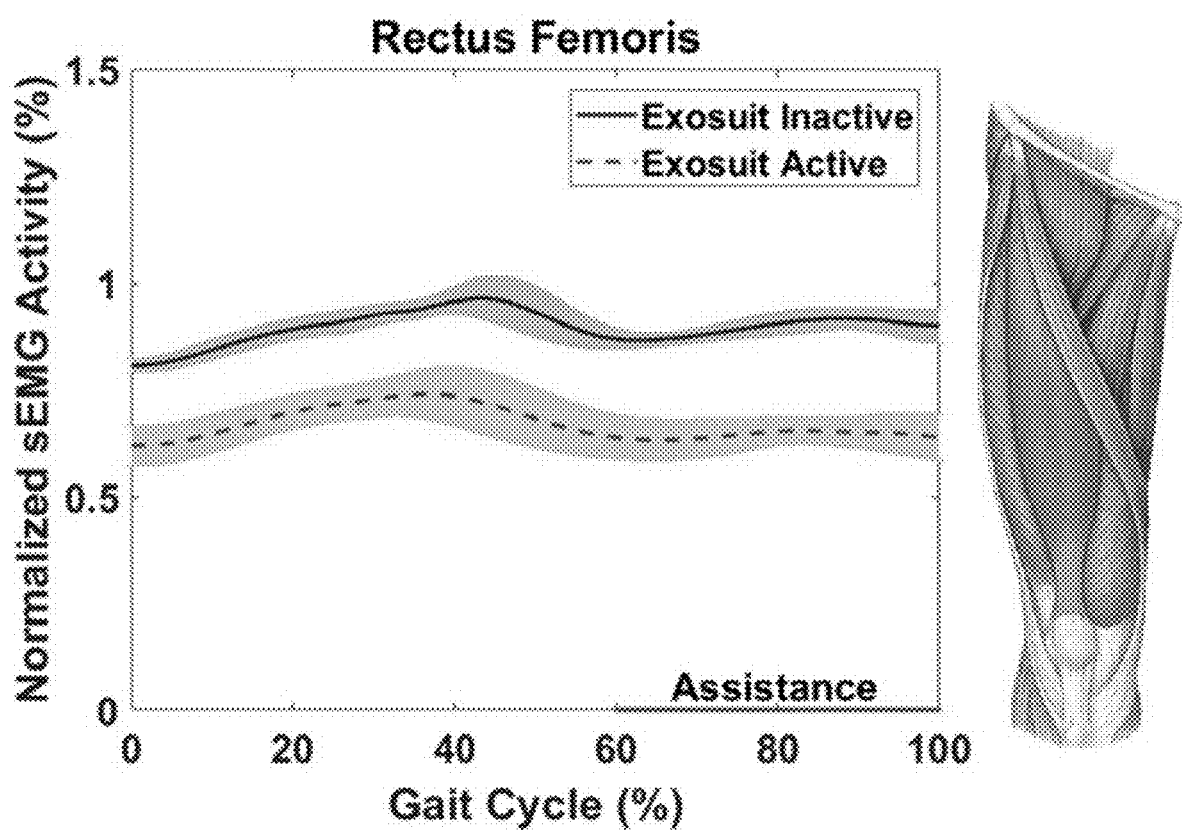
Figure 21D:
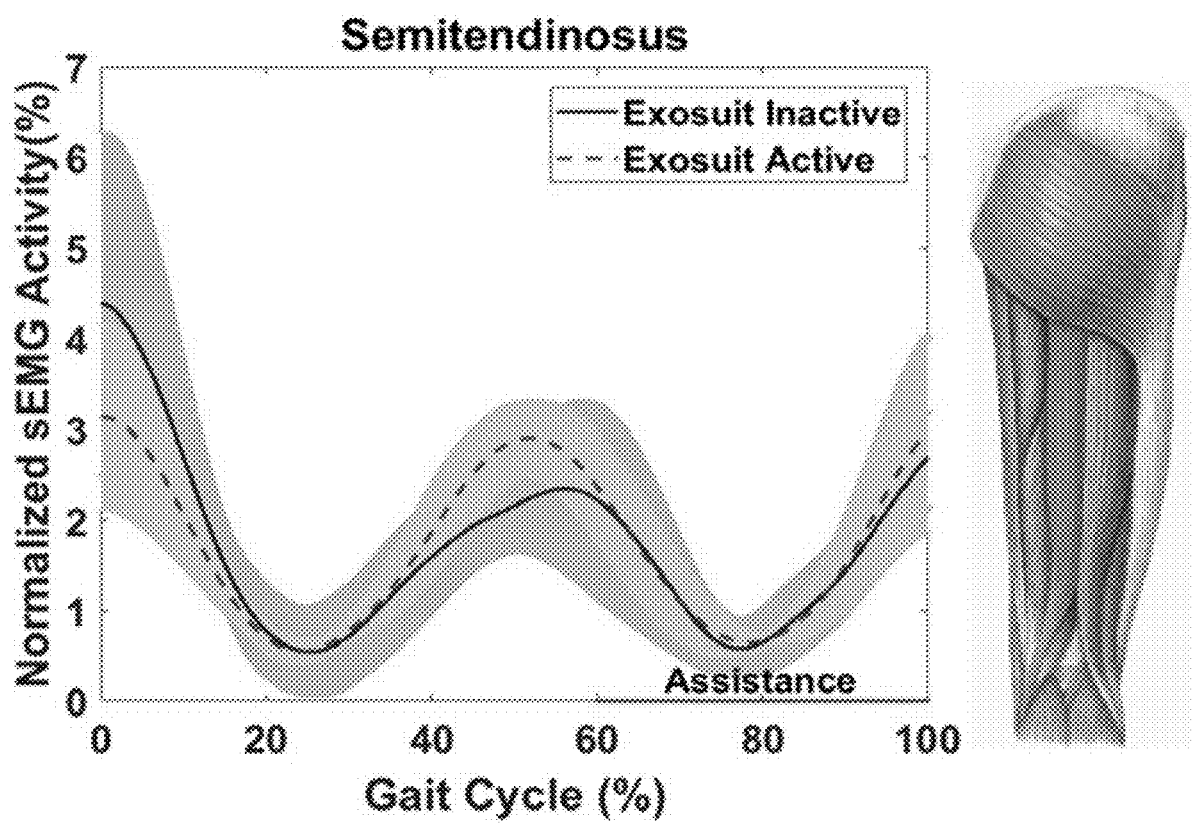
Figure 21E:
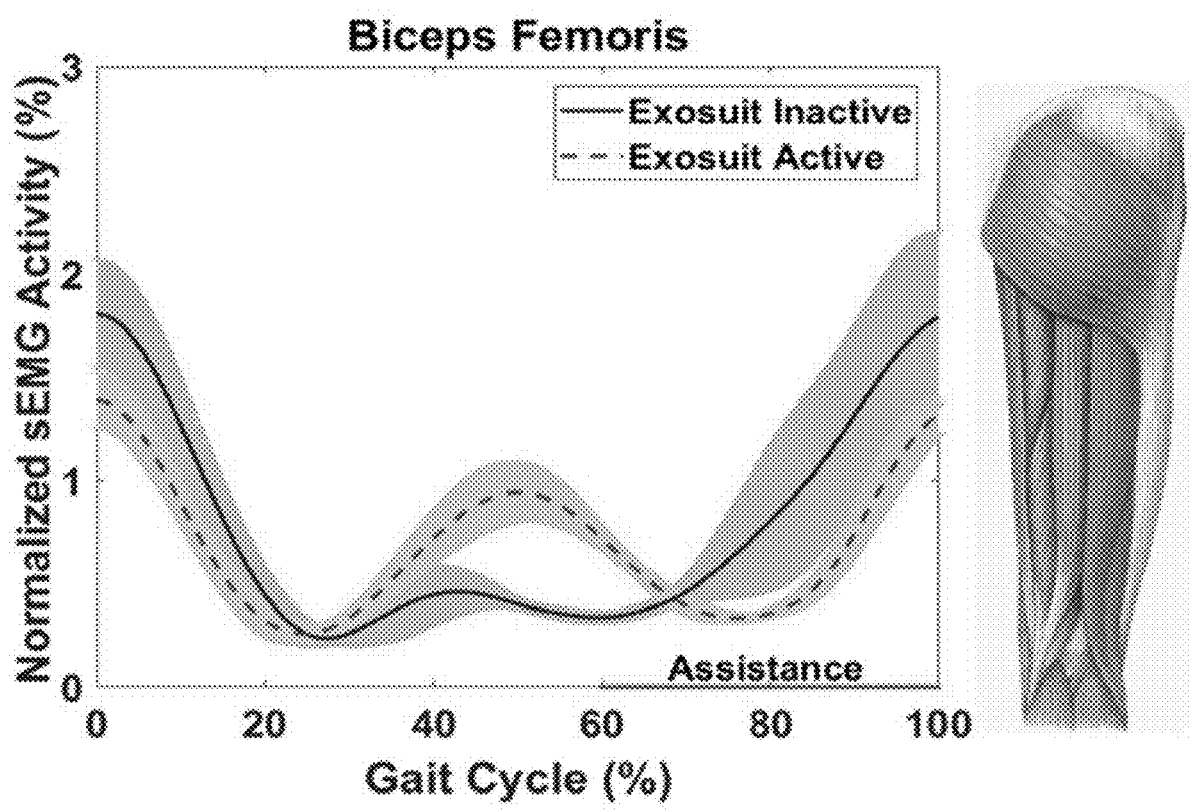
Figure 21F:
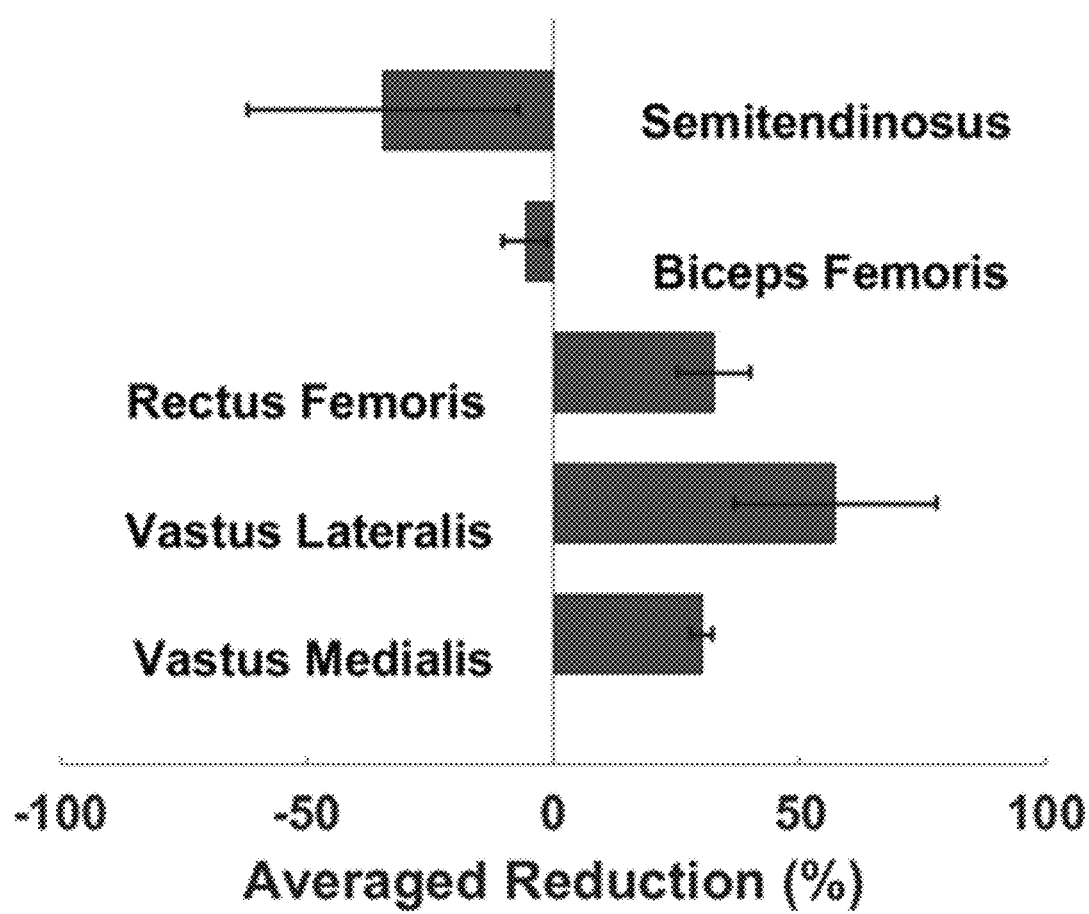

FIGS. 21A-E, depict the normalized sEMG activity over the VMC for one test participant for five muscle groups; VL, VM, RF, ST, and BF. FIG. 21F provides the averaged percentage reduction with the SD for the three test participants. An overall reduction of 57.16, 30.06, and 32.5% was observed in the muscle activity of the VL, VM, and RF, respectively, which are the major contributors for the leg extension motion at the knee joint (Snell, 2011). However, an increase of 5.7 and 34.56% in the BF and ST respectively was also observed when the exosuit is active. The increase in the muscle activity of the hamstrings in the pre-swing phase can be attributed to the delay in deflation leading to resistance in the knee flexion. Additionally, a decrease in the activity of the quadriceps during the stance phase was observed due to the aforementioned latency in deflation which provides an unintended positive assistance to the test participants.

The embodiments described herein can be applied to other parts of the body (e.g., elbow or other joints). In some embodiments, multiple actuators can be used around a single joint for increased freedom of movement. Actuators can be used either to facilitate a movement or, if used on the other side of the joint, to increase resistance (e.g., for resistance rehabilitation or workouts). In some embodiments, the system may comprise a suit that has actuators disposed throughout the suit to assist, stimulate, and/or provide resistance to multiple parts of the body (i.e., a "wearable gym" product).

What is claimed is:

1. A soft-inflatable exosuit device comprising:
an elastic fiber sleeve having a controller pouch and a plurality of actuator pockets;
a control device having at least one processor disposed within the controller pouch;
a plurality of adjustable straps coupled to the sleeve and configured to be tightened and loosened to adjust for fit on a user; and
a plurality of removable inflatable actuators, wherein each actuator is a separate component from the elastic fiber sleeve and is configured to be inserted and removed from a corresponding one of the plurality of actuator pockets to facilitate switching of the actuator with a different actuator.

2. The device of claim 1, further comprising an insole having a plurality of force-sensitive resistor sensors; wherein at least one of the plurality of actuators has an inflatable I-shaped cross-section when unpressurized, wherein the I-shaped cross-section includes: a plurality of longitudinal members disposed parallel to each other; and a connecting member disposed between the plurality of longitudinal members and perpendicular to the longitudinal members, wherein each of the plurality of longitudinal members extends laterally away from an end of the connecting member along a first direction, and laterally away from the end of the connecting member along a second, opposite direction.

3. The device of claim 1, further comprising:
at least one pneumatic supply source;
at least one pneumatic valve; and
at least one fluidic pressure sensor coupled to the plurality of actuators.

4. The device of claim 3, further comprising a vacuum pump.

5. The device of claim 3, wherein the control device is configured to control operation of the at least one pneumatic supply source, the at least one pneumatic valve, and the at least one fluidic pressure sensor to inflate and deflate the plurality of actuators.

6. The device of claim 1, wherein each of the plurality of actuators includes:
a plurality of heat sealable layers;
at least one heat seam; and
at least one air passage.

7. The device of claim 1, wherein each of the plurality of actuators includes:
a plurality of adhered layers;
at least one seam; and
at least one air passage.

8. The device of claim 1, wherein the actuator with the inflatable I-shaped cross-section is configured to inflate such that each of the plurality of longitudinal members forms a circular cross-section.

9. An exosuit device comprising:
a sleeve having a pocket;
an inflatable actuator removably inserted into the pocket;
a sensor positioned apart from the sleeve, the sensor in communication with the inflatable actuator, the sensor configured to control the pressurization of the inflatable actuator; and
a control device having at least one processor; wherein the actuator has an inflatable I-shaped cross-section when unpressurized, wherein the I-shaped cross-section includes: a plurality of longitudinal members disposed parallel to each other; and a connecting member disposed between the plurality of longitudinal members and perpendicular to the longitudinal members, wherein each of the plurality of longitudinal members extends laterally away from an end of the connecting member along a first direction, and laterally away from the end of the connecting member along a second, opposite direction.

10. The exosuit device of claim 9, wherein the sensor is positioned on an insole of a shoe, wherein the exosuit is configured to be positioned on a leg and spaced from the shoe, wherein the sensor is configured to detect states of a gait cycle while a user is walking.

11. The exosuit of claim 10, further comprising an internal measurement sensor coupled to the shoe, the internal measurement sensor having nine degrees of freedom.

12. The exosuit device of claim 9, wherein the sensor is part of a wireless monitoring system.

13. The exosuit device of claim 9, wherein the control device is positioned apart from the sleeve and is wirelessly connected to the sensor.

14. The exosuit device of claim 9, wherein the control device is configured to control operation of each of a pneumatic supply source, a pneumatic valve, and a fluidic pressure sensor to inflate and deflate the actuators, wherein the fluid pressure sensor is a separate sensor from the sensor positioned apart from the sleeve.

15. The exosuit of claim 9, further comprising a measurement unit coupled to the sleeve, the measurement unit configured to measure a bend angle of the sleeve.

16. The exosuit of claim 9, wherein the sensor is a pressure sensor integrated into a shoe, wherein the pressure sensor is configured to measure a pressure produced by different points on a foot, wherein the control device is configured to use the measured pressures to determine a degree of inflation of the actuator.

17. A method of operating the soft-inflatable exosuit device of claim 1, the method comprising:
applying the elastic fiber sleeve having the controller pouch and plurality of actuator pockets to a knee of a patient;
adjusting the plurality of adjustable straps to secure the sleeve to the knee;
inserting the plurality of removable inflatable actuators into the plurality of actuator pockets;
inflating the plurality of removable inflatable actuators between a mid-swing gait phase and a swing gait phase; and
deflating the plurality of removable inflatable actuators between the swing gait phase and the mid-swing gait phase.

18. The method of claim 17, further comprising applying a sensor to a leg of the patient prior to applying the elastic fiber sleeve to the knee of the patient, wherein the elastic fiber sleeve compresses the sensor against the leg of the user.

* * * * *